(12) United States Patent
Matsushita et al.

(10) Patent No.: US 10,816,034 B2
(45) Date of Patent: Oct. 27, 2020

(54) TAPERED ROLLER BEARING

(71) Applicant: NTN CORPORATION, Osaka (JP)

(72) Inventors: Tomoki Matsushita, Shizuoka (JP); Takashi Kawai, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 16/486,553

(22) PCT Filed: Feb. 12, 2018

(86) PCT No.: PCT/JP2018/005247
§ 371 (c)(1),
(2) Date: Aug. 16, 2019

(87) PCT Pub. No.: WO2018/151209
PCT Pub. Date: Aug. 23, 2018

(65) Prior Publication Data
US 2020/0056655 A1 Feb. 20, 2020

(30) Foreign Application Priority Data

Feb. 20, 2017 (JP) .................................. 2017-028940
Feb. 13, 2018 (JP) .................................. 2018-023218

(51) Int. Cl.
*F16C 33/36* (2006.01)
*F16C 33/58* (2006.01)
(Continued)

(52) U.S. Cl.
CPC .......... *F16C 19/364* (2013.01); *F16C 33/467* (2013.01); *F16C 2326/06* (2013.01)

(58) Field of Classification Search
CPC .... F16C 19/225; F16C 19/364; F16C 33/366; F16C 33/585; F16C 33/586
See application file for complete search history.

(56) References Cited

U.S. PATENT DOCUMENTS 6,086,261 A 7/2000 Nakagawa et al.
6,328,477 B1 12/2001 Tsujimoto et al.
(Continued)

FOREIGN PATENT DOCUMENTS

EP    1647727 A2 * 4/2006 ............ F16C 19/364
JP    6-241235      8/1994
(Continued)

OTHER PUBLICATIONS

International Preliminary Report on Patentability dated Aug. 20, 2019 in International (PCT) Appliction No. PCT/JP2018/005247.
(Continued)

*Primary Examiner* — Phillip A Johnson
(74) *Attorney, Agent, or Firm* — Wenderoth, Lind & Ponack, L.L.P.

(57) ABSTRACT

A tapered roller bearing includes inner and outer rings having tapered raceway surfaces. The inner ring also includes large-collar and small-collar surfaces respectively on large-diameter and small-diameter sides of its raceway surface. A plurality of tapered rollers are arrayed between the raceway surfaces. Each of the tapered rollers has a large end surface that contacts and is guided by the large-collar surface. A set curvature radius (R) of the large end surface of each of the tapered rollers and a base curvature radius ($R_{BASE}$) from a vertex of a cone angle of each of the tapered rollers to the large-collar surface has a ratio $R/R_{BASE}$ in a range of 0.75 to 0.87, and when $R_{ACTUAL}$ represents an actual curvature radius of the large end surface, a ratio $R_{ACTUAL}/R$ is equal to or larger than 0.5.

14 Claims, 16 Drawing Sheets

(51) Int. Cl.
*F16C 19/36* (2006.01)
*F16C 33/46* (2006.01)

(56) References Cited

U.S. PATENT DOCUMENTS

| | | | |
|---|---|---|---|
| 6,447,168 B2* | 9/2002 | Tsujimoto | F16C 33/585 |
| | | | 384/450 |
| 7,090,405 B2* | 8/2006 | Tsujimoto | F16C 33/62 |
| | | | 384/564 |
| 7,874,737 B2* | 1/2011 | Matsuyama | F16C 19/364 |
| | | | 384/571 |
| 2001/0031105 A1 | 10/2001 | Tsujimoto et al. | |
| 2002/0102041 A1* | 8/2002 | Matsuyama | F16C 33/366 |
| | | | 384/568 |
| 2002/0186908 A1* | 12/2002 | Tsujimoto | F16C 33/366 |
| | | | 384/450 |
| 2004/0047528 A1 | 3/2004 | Tsujimoto et al. | |
| 2009/0324155 A1 | 12/2009 | Okamoto et al. | |
| 2010/0002975 A1* | 1/2010 | Ueno | F16C 33/467 |
| | | | 384/571 |
| 2012/0033909 A1 | 2/2012 | Fujiwara | |

FOREIGN PATENT DOCUMENTS

| | | |
|---|---|---|
| JP | 11-201151 | 7/1999 |
| JP | 2000-170774 | 6/2000 |
| JP | 2006-112557 | 4/2006 |
| JP | 2008-30195 | 2/2008 |
| JP | 4165947 | 10/2008 |
| JP | 2013-174256 | 9/2013 |
| JP | 5334665 | 11/2013 |

OTHER PUBLICATIONS

International Search Report dated Apr. 3, 2018 in International (PCT) Application No. PCT/JP2018/005247.

* cited by examiner

— 1 —

TAPERED ROLLER BEARING

TECHNICAL FIELD

The present invention relates to a tapered roller bearing.

BACKGROUND ART

For applications in automobiles and industrial machinery, tapered roller bearings are often used at portions for bearing a radial load, an axial load, and a moment load. The tapered roller bearing in use can bear a certain axial load under a state in which a large end surface of each tapered roller and a large-collar surface of an inner ring are held in contact with each other. However, the above-mentioned contact between the large end surface of the tapered roller and the large-collar surface of the inner ring is not rolling contact but slide contact. Due to the slide contact, there is a fear in that heat generation and sharp temperature rise occur when a lubricating environment is insufficient.

In order to improve seizure resistance, it is required to reduce torque loss and heat generation caused by friction at a contact portion between the large end surface of the tapered roller and the large-collar surface of the inner ring. In this context, the following technologies are proposed (Patent Documents 1 and 2).

In Patent Document 1, as a method of improving an oil film thickness at the contact portion between the large end surface of the tapered roller and the large-collar surface of the inner ring (method of reducing heat generation), the following is proposed. Specifically, when R represents a curvature radius of the large end surface of the tapered roller, and $R_{BASE}$ represents a distance from a vertex of a cone angle of the tapered roller to the large-collar surface of the inner ring (contact portion with the tapered roller), a ratio $R/R_{BASE}$ is set within a range of from 0.75 to 0.87.

In Patent Document 2, there are proposed a method of forming a sufficient oil film through enhancement of an action of drawing a lubricating oil into a contact region between the large end surface of the tapered roller and the large-collar surface of the inner ring, and a method of solving edge abutment (a flaw problem) against the large end surface of the roller at the time of skew of the tapered roller.

Further, in Patent Document 3, as a method of prolonging bearing lifetime through optimization of contact surface pressure that may be generated on the tapered roller bearing, there is proposed a method of forming, for example, the tapered roller into a logarithmic crowning shape. Moreover, in Patent Document 4, there is proposed a method of displacing an abutment position of a rolling surface of the tapered roller with raceway surfaces of inner and outer rings to a large-diameter side thereof.

PRIOR ART DOCUMENTS

Patent Documents

Patent Document 1: JP 2000-170774 A
Patent Document 2: JP 4165947 B
Patent Document 3: JP 5334665 B
Patent Document 4: JP H11-201151 A

SUMMARY OF THE INVENTION

Problems to be Solved by the Invention

The technology of setting the ratio $R/R_{BASE}$ within the range of from 0.75 to 0.87 as proposed in Patent Document 1 is excellent as the method of improving the oil film thickness at the contact portion between the large end surface of the tapered roller and the large-collar surface of the inner ring (method of reducing heat generation). However, it is conceivable that skew of the tapered roller is less liable to occur as the ratio $R/R_{BASE}$ becomes closer to 1. Thus, when the ratio $R/R_{BASE}$ is set within the range of from 0.75 to 0.87, there is a problem in that skew of the tapered roller is more liable to occur as compared to a case of the related-art specifications (the ratio $R/R_{BASE}$ is within a range of from 0.90 to 0.97). Further, in Patent Document 1, an allowable range of an actual curvature radius obtained after the large end surface of the tapered roller is processed is not prescribed. Thus, the following problem was found. Specifically, even when the ratio $R/R_{BASE}$ is set within the range of from 0.75 to 0.87, skew larger than assumed was induced when the above-mentioned actual curvature radius was small.

The portion with the tapered roller bearing applied thereto is used under an environment in which a large radial load and a large axial load are borne and a moment load is applied at the same time. Further, due to a mounting error (misalignment) of the bearing, edge surface pressure is also increased, which is generated at an end portion of a contact region of the rolling surface of the tapered roller with the raceway surfaces of the inner and outer rings in a generating-line direction thereof. As a result, it is required that the inner ring have full-crowning or cut-crowning having a large drop amount and a single arc, and that the outer ring have full-crowning having a large drop amount and a single arc. However, when such crowning having a large drop amount is formed, the contact region (major axis dimension of a contact ellipse) of the rolling surface of the tapered roller with the raceway surfaces of the inner and outer rings is short. As a result, there is a problem in that, as compared to a case in which the contact region is long, larger unevenness is seen in the abutment position, and skew of the tapered roller is more liable to occur. This problem was found from verification results described later.

Occurrence of skew causes increase in a tangential force generated between the large end surface of the tapered roller and the large-collar surface of the inner ring, which results in increase in friction torque and heat generation. Moreover, when skew increases, there is a fear in that contact of the large end surface of the tapered roller is brought into edge abutment, which leads to metal-to-metal contact and heat generation.

As described above, there are a series of technical problems in the tapered roller bearing that is to be used at, for example, the portion at which a moment load is applied under an environment having a small amount of a lubricating oil, and the mounting error of the bearing occurs. The present invention has been made with focus on the series of technical problems.

In view of the problems described above, the present invention has an object to provide a tapered roller bearing capable of suppressing heat generation at a large end surface of a tapered roller and a large-collar surface of an inner ring even under a severe lubricating environment, thereby improving seizure resistance and prolonging lifetime.

Solution to the Problems

As a result of extensive study and verification having been made to achieve the object described above, the inventors of the present invention have achieved the present invention based on the following novel ideas that relate to organically associated internal specifications of the tapered roller bearing.

(1) A ratio of an optimum curvature radius of a large end surface of a tapered roller to an actual curvature radius after processing.
(2) Shapes of raceway surfaces of inner and outer rings for suppressing skew of the tapered roller.
(3) Application of logarithmic crowning to a rolling surface of the tapered roller.

As a technical measure to achieve the above-mentioned object, according to a first aspect of the present invention, there is provided a tapered roller bearing, comprising: an outer ring having a tapered raceway surface on an inner periphery thereof; an inner ring having a tapered raceway surface on an outer periphery thereof, and comprising a large-collar surface on a large-diameter side of the raceway surface, and a small-collar surface on a small-diameter side of the raceway surface; a plurality of tapered rollers arrayed between both of the raceway surfaces so as to be freely rollable; and a cage configured to receive the tapered rollers, each of the tapered rollers having a large end surface to be held in contact with and guided by the large-collar surface of the inner ring during use of the bearing, wherein when R represents a set curvature radius of the large end surface of each of the tapered rollers, and $R_{BASE}$ represents a base curvature radius from a vertex of a cone angle of each of the tapered rollers to the large-collar surface of the inner ring, a ratio $R/R_{BASE}$ of the set curvature radius R to the base curvature radius $R_{BASE}$ is set within a range of from 0.75 to 0.87, and wherein when $R_{ACTUAL}$ represents an actual curvature radius of the large end surface of each of the tapered rollers, a ratio $R_{ACTUAL}/R$ of the actual curvature radius $R_{ACTUAL}$ to the set curvature radius R is set equal to or larger than 0.5.

Further, according to a second aspect of the present invention, there is provided a tapered roller bearing, comprising: an outer ring having a tapered raceway surface on an inner periphery thereof; an inner ring having a tapered raceway surface on an outer periphery thereof, and comprising a large-collar surface on a large-diameter side of the raceway surface, and a small-collar surface on a small-diameter side of the raceway surface; a plurality of tapered rollers arrayed between both of the raceway surfaces so as to be freely rollable; and a cage configured to receive the tapered rollers, each of the tapered rollers having a large end surface to be held in contact with and guided by the large-collar surface of the inner ring during use of the bearing, wherein when R represents a set curvature radius of the large end surface of each of the tapered rollers, and $R_{BASE}$ represents a base curvature radius from a vertex of a cone angle of each of the tapered rollers to the large-collar surface of the inner ring, a ratio $R/R_{BASE}$ of the set curvature radius R to the base curvature radius $R_{BASE}$ is set within a range of from 0.75 to 0.87, and wherein when $R_{ACTUAL}$ represents an actual curvature radius of the large end surface of each of the tapered rollers, a ratio $R_{ACTUAL}/R$ of the actual curvature radius $R_{ACTUAL}$ to the set curvature radius R is set equal to or larger than 0.8.

With the above-mentioned configuration, through suppression of heat generation at the large end surface of each of the tapered rollers and the large-collar surface of the inner ring even under a severe lubricating environment, the tapered roller bearing capable of improving seizure resistance and prolonging lifetime can be achieved. In particular, through introduction of a "collar-portion lubrication coefficient" as a reference indicating a level of severity of the lubrication state, a practicable range of the ratio of the actual curvature radius $R_{ACTUAL}$ to the set curvature radius R can be enlarged. Thus, depending on use conditions, proper bearing specifications can be selected.

When the large end surface of each of the tapered rollers and the large-collar surface of the inner ring are superfinished surfaces, an oil film parameter is enhanced, thereby being capable of improving a lubricating condition.

When the large-collar surface of the inner ring has a relief surface, an action of drawing a lubricating oil into a contact region between the large-collar surface and the large end surface of each of the tapered rollers is enhanced, thereby being capable of forming a sufficient oil film.

It is preferred that the raceway surface of the inner ring and the raceway surface of the outer ring be each formed into a straight shape or a full-crowning shape having a gentle arc, and that the tapered rollers each have a rolling surface formed into a logarithmic crowning shape. With this configuration, edge abutment between the tapered rollers and the raceway surfaces, and skew can be suppressed.

It is preferred that at least one bearing component among the inner ring, the outer ring, and the tapered rollers have a nitrogen-enriched layer, and that the grain size number of austenite crystal grain in the nitrogen-enriched layer be larger than No. 10. The nitrogen-enriched layer refers to a layer that has an increased nitrogen content and is formed on a raceway ring (the outer ring or the inner ring) or a surface layer of each of the tapered rollers. For example, the nitrogen-enriched layer can be formed through treatment such as carbonitriding, nitriding, or nitridization. It is preferred that the nitrogen content of the nitrogen-enriched layer be within a range of from 0.1% to 0.7%. When the nitrogen content is lower than 0.1%, no effect is attained, and rolling lifetime is reduced, in particularly, under a foreign matter contamination condition. When the nitrogen content is higher than 0.7%, a pore called "void" may be formed, and retained austenite may be excessively large in quantity. As a result, sufficient hardness is not obtained, and lifetime is reduced. The nitrogen content of the nitrogen-enriched layer formed on the raceway ring is a value measured at a surface layer having a size of 50 μm on the raceway surface after grinding, and is measured by a wavelength dispersive X-ray micro analyzer such as an EPMA.

Further, an austenite grain diameter is so fine that the grain size number of austenite crystal grain exceeds No. 10. Accordingly, rolling fatigue lifetime can be significantly improved. When the grain size number of the austenite grain diameter is equal to or smaller than No. 10, the rolling fatigue lifetime is not significantly improved, and hence the grain size number is set larger than No. 10. Normally, the grain size number is set equal to or larger than No. 11. It is desired that the austenite grain diameter be finer, but it is normally difficult to obtain the grain size number exceeding No. 13. Austenite grain in the above-mentioned bearing component does not change both on a surface layer portion having the nitrogen-enriched layer and on an inner side of the surface layer portion. Therefore, target positions having the above-mentioned range of the crystal grain size number are the surface layer portion and the inner side thereof. Even after, for example, quenching treatment is performed, the austenite crystal grain has a trace of an austenite crystal grain boundary immediately before the quenching, and the austenite crystal grain refers to crystal grain obtained based on the trace.

It is preferred that a center of an abutment position between the rolling surface of each of the tapered rollers and the raceway surface of the inner ring, and a center of an abutment position between the rolling surface of each of the tapered rollers and the raceway surface of the outer ring are displaced from an axial center of each of the tapered rollers to the large-diameter side by a dimension that is larger than 0% of an effective rolling surface width of each of the tapered rollers and smaller than 20% of the effective rolling surface width. With this configuration, skew of the tapered roller and rotation torque of the bearing can be reduced.

The tapered roller bearing according to the present invention is suitably used for a transmission and a differential for an automobile.

Effects of the Invention

According to the present invention, through suppression of heat generation at the large end surface of each of the tapered rollers and the large-collar surface of the inner ring even under a severe lubricating environment, the tapered roller bearing capable of improving seizure resistance and prolonging lifetime can be achieved. In particular, through introduction of the "collar-portion lubrication coefficient" as a reference indicating a level of severity of the lubrication state, a practicable range of the ratio of the actual curvature radius $R_{ACTUAL}$ to the set curvature radius R can be enlarged. Thus, depending on use conditions, proper bearing specifications can be selected.

BRIEF DESCRIPTION OF DRAWINGS

FIG. 4b is an enlarged vertical sectional view for illustrating a portion "A" of FIG. 4a.

FIG. 8b is an enlarged view for illustrating a portion "D" of FIG. 8a.

FIG. 13a is an illustration of the austenite grain boundary of FIG. 12a.

EMBODIMENTS OF THE INVENTION

Figure 1:
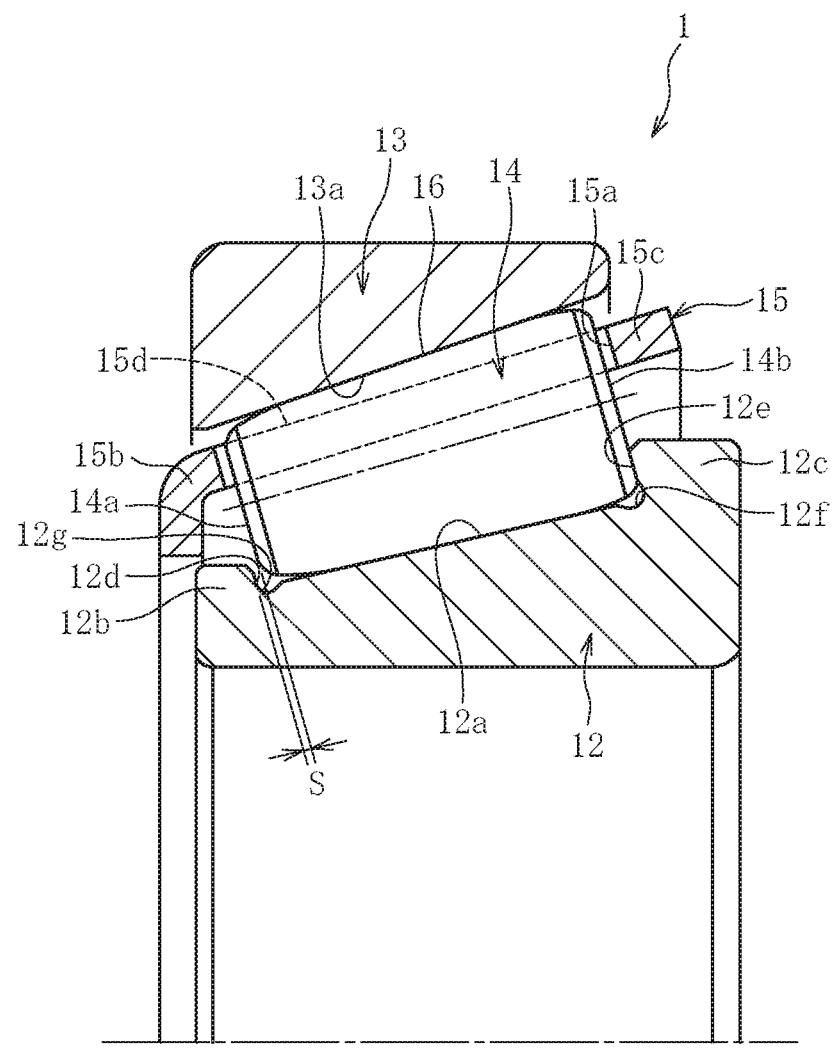
FIG. 1 is a vertical sectional view for illustrating a tapered roller bearing according to a first embodiment of the present invention.

A tapered roller bearing according to a first embodiment of the present invention is described with reference to FIG. 1 to FIG. 15. First, the outline of the tapered roller bearing according to this embodiment is described with reference to FIG. 1, FIG. 6, and FIG. 8. FIG. 1 is a vertical sectional view for illustrating an upper half of the tapered roller bearing according to this embodiment with respect to a center line of the tapered roller bearing. FIG. 6 is a vertical sectional view for illustrating a detailed shape of a tapered roller of FIG. 1. FIG. 8 are vertical sectional views for illustrating a detailed shape of an inner ring of FIG. 1.

As illustrated in FIG. 1, a tapered roller bearing 1 comprises an inner ring 12, an outer ring 13, tapered rollers 14 incorporated between the inner ring 12 and the outer ring 13, and a cage 15 configured to retain the tapered rollers 14. An inner-ring-side raceway surface 12a (hereinafter, simply referred to as "raceway surface 12a") having a tapered shape is formed on an outer periphery of the inner ring 12. A small-collar portion 12b is formed on a small-diameter side, and a large-collar portion 12c is formed on a large-diameter side. An outer-ring-side raceway surface 13a (hereinafter, simply referred to as "raceway surface 13a") having a tapered shape is formed on an inner periphery of the outer ring 13. The plurality of tapered rollers 14 are incorporated between the raceway surface 12a of the inner ring 12 and the raceway surface 13a of the outer ring 13. The tapered rollers 14 are respectively received in pockets 15a of the cage 15, and are retained at equal intervals in a circumferential direction of the cage 15.

A ground relief portion 12f is formed at a corner portion at which the raceway surface 12a of the inner ring 12 and a large-collar surface 12e of the large-collar portion 12c intersect each other, and a ground relief portion 12g is formed at a corner portion at which the raceway surface 12a and a small-collar surface 12d of the small-collar portion 12b intersect each other. As described above, the ground relief portions 12f and 12g are formed on the raceway surface 12a of the inner ring 12, and hence an effective raceway surface width LG (see FIG. 8a) of the raceway surface 12a is smaller than an effective rolling surface width LW (see FIG. 6) of a rolling surface 16 of each of the tapered rollers 14.

The rolling surface 16 having a tapered shape is formed on an outer periphery of the tapered roller 14. A small end surface 14a is formed on a small-diameter side of the tapered roller 14, and a large end surface 14b is formed on a large-diameter side of the tapered roller 14. The large end surface 14b of the tapered roller 14 is received by the large-collar surface 12e of the inner ring 12. During use of the tapered roller bearing 1, the large end surface 14b is held in contact with and guided by the large-collar surface 12e of the inner ring 12. Here, the large end surface 14b is a ground surface. As illustrated in FIG. 6, the rolling surface 16 of the tapered roller 14 comprises a straight portion 16a and crowning portions 16b and 16c. The straight portion 16a is formed at a center portion of the rolling surface 16 in a generating-line direction thereof. The crowning portions 16b and 16c are formed at both end portions of the rolling surface 16 in the generating-line direction. Drop amounts of the crowning portions 16b and 16c are illustrated in FIG. 6 with emphasis. Details of the crowning portions 16b and 16c are described later. As illustrated in FIG. 1, the cage 15 comprises a small-diameter-side annular portion 15b, a large-diameter-side annular portion 15c, and a plurality of pillar portions 15d connecting the small-diameter-side annular portion 15b and the large-diameter-side annular portion 15c to each other in an axial direction of the tapered roller bearing 1.

A gap S between the small end surface 14a of the tapered roller 14 and the small-collar surface 12d illustrated in FIG. 1 is set equal to or smaller than 0.3 mm. Accordingly, the effect of suppressing skew can be attained, and adapting rotation performed at the time of assembly of the tapered roller bearing 1 is reduced, thereby improving ease of assembly.

Figure 2:
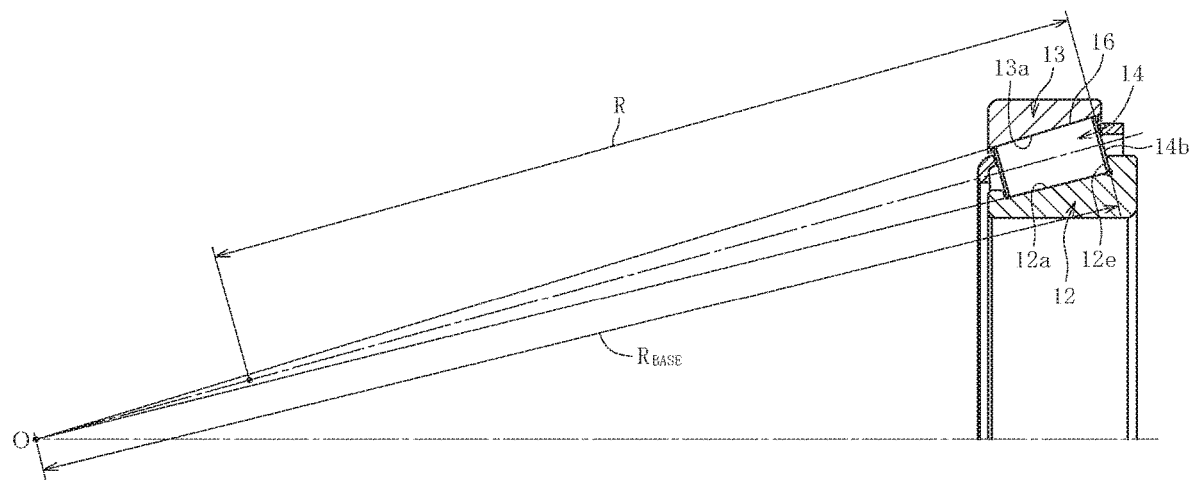
FIG. 2 is a vertical sectional view for illustrating design specifications of a large end surface of a tapered roller and a large-collar surface of an inner ring of FIG. 1.
Figure 3:
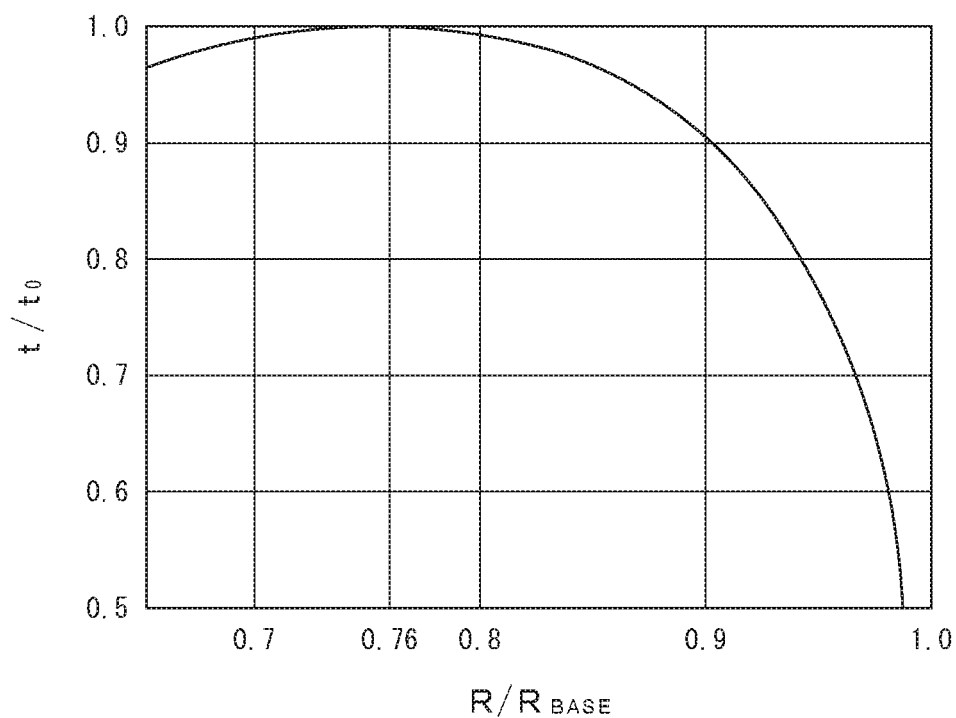
FIG. 3 is a graph for showing a relationship between a curvature radius of the large end surface of the tapered roller of FIG. 1 and an oil film thickness.
Figure 4A:
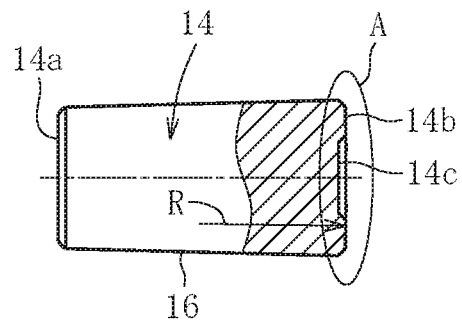
FIG. 4a is a vertical sectional view of the tapered roller for illustrating a detailed shape of the large end surface of the tapered roller of FIG. 1.
Figure 4B:
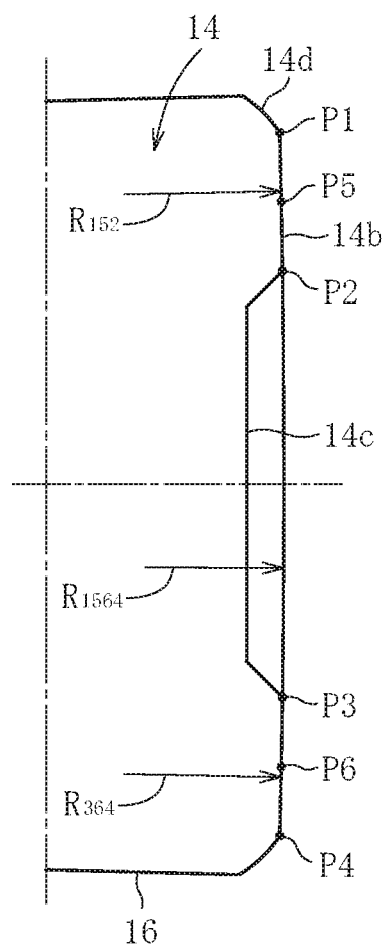
Figure 4C:
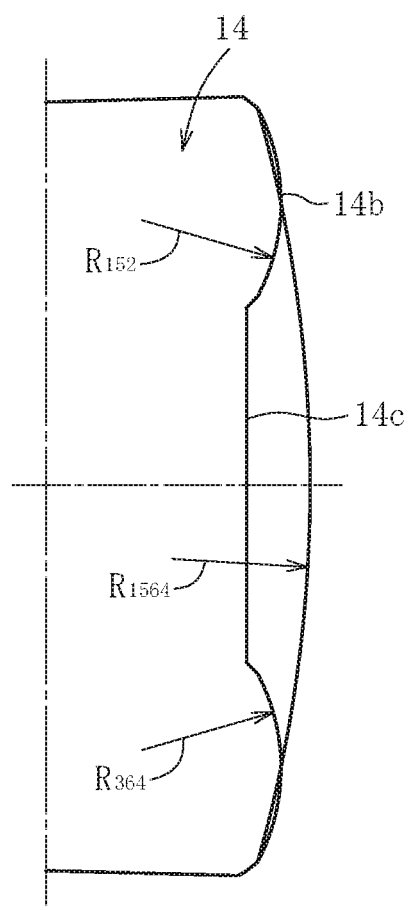
FIG. 4c is a schematic view of FIG. 4b.

The outline of the tapered roller bearing 1 according to this embodiment is described above. Next, characteristic configurations of the tapered roller bearing 1 according to this embodiment are described. First, with reference to FIG. 2 to FIG. 4, description is made of a ratio of an optimum curvature radius of the large end surface of the tapered roller to an actual curvature radius after processing, which is a first characteristic configuration. FIG. 2 is a vertical sectional view for illustrating design specifications of the large end surface of the tapered roller and the large-collar surface of the inner ring of FIG. 1. FIG. 3 is a graph for showing a relationship between the curvature radius of the large end surface of the tapered roller of FIG. 1 and an oil film thickness. FIG. 4 are views for illustrating a detailed shape of the large end surface of the tapered roller of FIG. 1. FIG. 4a is a vertical sectional view for illustrating the tapered roller. FIG. 4b is an enlarged vertical sectional view for illustrating a portion "A" of FIG. 4a. FIG. 4c is a schematic view of FIG. 4b. In FIG. 4b and FIG. 4c, hatching is omitted for simplification of the illustrations.

As illustrated in FIG. 2, vertices of cone angles of the rolling surface 16 of the tapered roller 14, the raceway surface 12a of the inner ring 12, and the raceway surface 13a of the outer ring 13 match with each other at a point O on a center axis of the tapered roller bearing 1. A ratio $R/R_{BASE}$ of the optimum curvature radius R of the large end surface 14b of the tapered roller 14 to a distance $R_{BASE}$ from the vertex O to the large-collar surface 12e of the inner ring 12 is set within a range of from 0.75 to 0.87 in order to improve the oil film thickness at a contact portion between the large end surface 14b of the tapered roller 14 and the large-collar surface 12e of the inner ring 12.

FIG. 3 is a graph for showing a ratio of the thickness of the oil film formed between the large end surface 14b of the tapered roller 14 and the large-collar surface 12e of the inner ring 12 with respect to the relationship of the ratio $R/R_{BASE}$. The thickness of the oil film formed between the large end surface 14b of the tapered roller 14 and the large-collar surface 12e of the inner ring 12 is represented by "t", and the vertical axis indicates a ratio $t/t_0$ of the thickness "t" to an oil film thickness "t0" given when the ratio $R/R_{BASE}$ is 0.76. As shown in FIG. 3, the oil film thickness "t" is maximum when the ratio $R/R_{BASE}$ is 0.76, and sharply decreases when the ratio $R/R_{BASE}$ exceeds 0.9.

In terms of the optimum value of the oil film thickness, as described in Patent Document 1, the ratio $R/R_{BASE}$ is in a range of from 0.75 to 0.87. Thus, next, a relationship between a skew angle of the tapered roller 14 and the ratio $R/R_{BASE}$ is studied. The ratio $R/R_{BASE}$ in this study is based on condition that the large end surface 14b of the tapered roller 14 is in a contact state while having a set ideal spherical surface (including no processing error). A relationship between the ratio $R/R_{BASE}$ and the skew angle of the tapered roller 14 is shown in Table 1.

TABLE 1

| | Ratio $R/R_{BASE}$ | | | | | |
|---|---|---|---|---|---|---|
| | 1 | 0.95 | 0.9 | 0.85 | 0.8 | 0.75 |
| Skew angle (°) | 0 | 0.03 | 0.06 | 0.09 | 0.12 | 0.15 |

As shown in Table 1, it was found that, as the ratio $R/R_{BASE}$ decreases, the skew angle increases. Meanwhile, the curvature radius R of the large end surface 14b of the tapered roller 14 shown in FIG. 3 corresponds to a dimension of the curvature radius R obtained when the large end surface 14b of the tapered roller 14 illustrated in FIG. 4a has the set ideal spherical surface. Specifically, as illustrated in FIG. 4b, when points P1, P2, P3, and P4, a midpoint P5 between the points P1 and P2, and a midpoint P6 between the points P3 and P4 are set at an end portion of the large end surface 14b of the tapered roller 14, a curvature radius $R_{152}$ passing the points P1, P5, and P2, a curvature radius $R_{364}$ passing the points P3, P6, and P4, and a curvature radius $R_{1564}$ passing the points P1, P5, P6, and P4 form an ideal single arc curve satisfying a relation of $R=R_{152}=R_{364}=R_{1564}$. In the above description, the points P1 and P4 are each a connection point between the large end surface 14b and an end surface chamfer 14d, and the points P2 and P3 are each a connection point between the large end surface 14b and a relief portion 14c. Here, the ideal single arc curve satisfying the relation of $R=R_{152}=R_{364}=R_{1564}$ is referred to as "set curvature radius R". The set curvature radius R described in Claims bears the above-mentioned meaning.

However, in actuality, as illustrated in FIG. 4c, shear drops are formed at both ends of the large end surface 14b at the time of grinding. Consequently, the curvature radius $R_{152}$ on one side is not equal to but smaller than the curvature radius $R_{1564}$ of the entire large end surface 14b (the same holds true for the curvature radius $R_{364}$ on another side). Here, the curvature radius $R_{152}$ on the one side or the curvature radius $R_{364}$ on the another side obtained after the large end surface 14b of the tapered roller 14 is processed is referred to as "actual curvature radius $R_{ACTUAL}$". The actual curvature radius $R_{ACTUAL}$ described in Claims bears the above-mentioned meaning.

The set curvature radius R and the actual curvature radius $R_{ACTUAL}$ are obtained as follows. The curvature radius $R_{1564}$ of the entire large end surface 14b of FIG. 4c is an approximate circle passing the four points P1, P5, P6, and P4 on the large end surface 14b illustrated in FIG. 4b. A measurement method for the curvature radii $R_{152}$, $R_{364}$, and $R_{1564}$ is described. The curvature radii $R_{152}$, $R_{364}$, and $R_{1564}$ were measured through use of the surface roughness measurement instrument "Surftest" (for example, model name: SV-3100) manufactured by Mitutoyo Corporation. In the measurement method, through use of the above-mentioned measurement instrument, a shape of the large end surface 14b of the tapered roller 14 in the generating-line direction was obtained, the points P1, P2, P3, and P4 were plotted, and then the midpoint P5 between the points P1 and P2 and the midpoint P6 between the points P3 and P4 were plotted. The curvature radius $R_{152}$ on the one side was calculated as a radius of an arc curve passing the points P1, P5, and P2 (the same holds true for the curvature radius $R_{364}$ on the another side). The curvature radius $R_{1564}$ of the entire large end surface 14b was calculated as a radius of an approximate arc curve based on values obtained by plotting four points through use of a command of "multiple input". The shape of the large end surface 14b in the generating-line direction was measured once in a diameter direction.

Next, description is made of an influence due to a difference between the set curvature radius R and the actual curvature radius $R_{ACTUAL}$. The large end surface 14b of the tapered roller 14 and the large-collar surface 12e of the inner ring 12 are brought into contact with each other only at a portion having the curvature radius $R_{152}$ on the one side or the curvature radius $R_{364}$ on the another side. Thus, in actuality, when the large end surface 14b and the large-collar surface 12e are brought into contact with each other with the actual curvature radius $R_{ACTUAL}$ ($R_{152}$, $R_{364}$) smaller than the set curvature radius R ($R_{1564}$). Accordingly, contact surface pressure between the large end surface 14b and the large-collar surface 12e increases, and at the same time, the skew angle of the tapered roller 14 increases. The above-mentioned problem was found through verification of the actual grinding.

When the skew angle increases and the contact surface pressure also increases under an environment in which an oil film is not sufficiently provided, contact between the large end surface 14b of the tapered roller 14 and the large-collar surface 12e is unstable, with the result that an oil film parameter decreases. When the oil film parameter is smaller than 1, boundary lubrication occurs, which leads to beginning of metal-to-metal contact, and hence a risk of occurrence of seizing may increase. Here, the oil film parameter is defined by a ratio $\Lambda$ ($=h/\sigma$) of an oil film thickness h determined by the elastohydrodynamic lubrication theory to a composite roughness $\sigma$ of a root mean square roughness of the large end surface 14b of the tapered roller 14 and a root mean square roughness of the large-collar surface 12e of the inner ring 12.

Based on the result of study on the influence due to the difference between the set curvature radius R and the actual curvature radius $R_{ACTUAL}$ associated with the above-mentioned grinding, focus is made on a ratio of the actual curvature radius $R_{ACTUAL}$ to the set curvature radius R, and verification is made on a relationship among the contact surface pressure between the large end surface and the large-collar surface, the oil film thickness, the skew angle, and the oil film parameter. Moreover, through verification on a practicable range of the ratio of the actual curvature radius $R_{ACTUAL}$ to the set curvature radius R, it has been found that influence is exerted on a level of severity of a lubrication state at a peak of an operating temperature of a lubricating oil between the large-collar surface of the inner ring and the large end surface of the tapered roller that are held in slide contact with each other.

Accordingly, the following study is made on a reference indicating the level of severity of the lubrication state at the peak of the operating temperature of the lubricating oil between the large-collar surface of the inner ring and the large end surface of the tapered roller.

(1) Focus is made on the following. The large-collar surface is a tapered surface, and hence is linear and constant. Thus, the lubrication state between the large-collar surface of the inner ring and the large end surface of the tapered roller is determined by the curvature radius (actual curvature radius $R_{ACTUAL}$) of the large end surface of the tapered roller and the operating temperature of the lubricating oil.

(2) Further, focus is made on the following. For applications to a transmission and a differential, the lubricating oil to be used is basically determined. Thus, viscosity of the lubricating oil is also determined.

(3) As a maximum condition at the peak of the operating temperature of the lubricating oil, an extremely severe temperature condition in which the peak is kept at a temperature of 120° C. for three minutes (one hundred and eighty seconds) is assumed. This temperature condition is the maximum condition at the peak, and bears the meaning that a steady state is returned after the elapse of about three minutes. In Description, this temperature condition is referred to as "assumed peak temperature condition". It has been found that a threshold value can be obtained to set the ratio of the actual curvature radius $R_{ACTUAL}$ to the set curvature radius R, which does not cause sharp temperature rise under a lubrication state in which a viscosity characteristic of the lubricating oil is added to the "assumed peak temperature condition".

Based on the above-mentioned findings, the following was conceived. With reference to the lubrication state in which the viscosity of the lubricating oil is added to the "assumed peak temperature condition", the reference indicating the level of severity of the lubrication state is obtained by the following relation. In Description, this reference is referred to as "collar-portion lubrication coefficient".

"Collar-portion lubrication coefficient"=viscosity at 120° C.×(oil film thickness h)²/180 seconds Here, the oil film thickness h is obtained by the following expression of Karna.

$$h=1.64\times10^{-3}(\eta_o \bar{u})^{0.74} R_x^{0.41} W^{-0.074} \qquad \text{[Expression 1]}$$

$R_x$: Equivalent curvature radius in a direction of motion
$\bar{u}$: Average speed
w: Load
$\eta_o$: Viscosity at normal pressure A turbine oil having ISO viscosity grade of VG32, which is a lubricating oil often used for a transmission, was used as a sample, and the "collar-portion lubrication coefficient" was calculated. The viscosity of VG32 at a temperature of 120° C. was 7.7 cSt (=7.7 mm²/s), and the oil film thickness h was obtained by Expression 1. As shown in Table 2, the oil film thickness h has the following values with respect to respective values of the ratio of the actual curvature radius $R_{ACTUAL}$ to the set curvature radius R.

TABLE 2

| | Ratio $R_{ACTUAL}/R$ of actual curvature radius $R_{ACTUAL}$ to set curvature radius R | | | | | |
|---|---|---|---|---|---|---|
| | 0.4 | 0.5 | 0.7 | 0.8 | 0.9 | 1.0 |
| Oil film thickness h (×10⁻⁴ mm) | 3.343 | 3.782 | 4.332 | 4.527 | 4.624 | 4.632 |

The viscosity of VG32 at the temperature of 120° C. is low, and the lubrication state in which the viscosity of the lubricating oil is added to the "assumed peak temperature condition" is extremely severe. In Description, this lubrication state is referred to as "extremely severe lubrication state".

In addition, a seizure resistance test using a rotary testing machine was carried out. A test condition for the seizure resistance test is as follows.

<Test Condition>

Bearing load: radial load of 4,000 N, axial load of 7,000 N

Rpm: 7,000 $min^{-1}$

Lubricating oil: turbine oil having ISO viscosity grade of VG32

Sample bearing: tapered roller bearing (having an inner diameter φ of 35 mm, an outer diameter φ of 74 mm, and a width of 18 mm)

For respective values of the ratio of the actual curvature radius $R_{ACTUAL}$ to the set curvature radius R, results of the contact surface pressure between the large end surface and the large-collar surface, the oil film thickness, the skew angle, the oil film parameter, and the "collar-portion lubrication coefficient" are shown in Table 3. In Table 3, the contact surface pressure, the oil film thickness, the skew angle, and the oil film parameter are shown as ratios. A denominator as a standard corresponds to a value obtained when processing can be performed so that the actual curvature radius $R_{ACTUAL}$ has the same dimension as that of the set curvature radius R, and a sign of 0 is added to each symbol representing the denominator.

TABLE 3

| | Ratio $R_{ACTUAL}/R$ of actual curvature radius $R_{ACTUAL}$ to set curvature radius R | | | | | |
|---|---|---|---|---|---|---|
| | 0.4 | 0.5 | 0.7 | 0.8 | 0.9 | 1.0 |
| Contact surface pressure ratio p/p0 between large end surface and large-collar surface | 2.7 | 2.2 | 1.6 | 1.4 | 1.2 | 1 |
| Oil film thickness ratio h/h0 | 0.72 | 0.82 | 0.94 | 0.98 | 1.00 | 1.00 |
| Skew angle ratio φ/φ0 | 8 | 5 | 3 | 1.5 | 1.2 | 1 |
| Oil film parameter ratio Λ/Λ0 | 0.72 | 0.82 | 0.94 | 0.98 | 1.00 | 1.00 |
| Collar-portion lubrication coefficient (×$10^{-9}$) | 4.78 | 6.12 | 8.03 | 8.77 | 9.14 | 9.18 |
| Test result | (1) x | (2) Δ | (3) Δ | (4) ○ | (5) ○ | (6) ○ |
| Overall determination | (1) x | (2) x | (3) Δ | (4) ○ | (5) ○ | (6) ○ |

Details of test results (1) to (6) and overall determinations (1) to (6) in Table 3 are shown in Table 4.

TABLE 4

| | Test result | | | | | |
|---|---|---|---|---|---|---|
| | (1) x A temperature rose sharply. | (2) Δ Strong abutment was seen between the large end surface of the roller and the large-collar surface of the inner ring. | (3) Δ The same result as the left column. | (4) ○ A significant change point was not particularly seen. | (5) ○ The same result as the left column. | (6) ○ The same result as the left column. |
| Overall determination | (1) x The "collar-portion lubrication coefficient" was low, strong abutment occurred, and the skew angle was large. Accordingly, it was determined as x. | (2) x The "collar-portion lubrication coefficient" was low, strong abutment occurred, and the skew angle was slightly large. Thus, there was a fear in that a behavior of the roller was unstable during rotation of the bearing. Accordingly, it was determined as x. | (3) Δ The "collar-portion lubrication coefficient" was low, and strong abutment occurred. However, the skew angle was substantially small, and hence it was determined that development of sudden damage did not immediately occur. Accordingly, it was determined as Δ. | (4) ○ The "collar-portion lubrication coefficient" exceeded 8 × $10^{-9}$, a sufficient oil film was formed, and the skew angle was small. Thus, stable rotation was obtained, and there was no problem in continuous use. Accordingly, it was determined as ○. | (5) ○ The same determination as the left column. | (6) ○ The same determination as the left column. |

A conclusion drawn from the results in Table 3 and Table 4 is that it is desired that the ratio $R_{ACTUAL}/R$ of the actual curvature radius $R_{ACTUAL}$ to the set curvature radius R be equal to or larger than 0.8 in the "extremely severe lubrication state" in which a low-viscosity oil of VG32 being a transmission oil is used. Therefore, in this embodiment, the ratio $R_{ACTUAL}/R$ of the actual curvature radius $R_{ACTUAL}$ to the set curvature radius R is set equal to or larger than 0.8.

However, the tapered roller bearing according to this embodiment is not limited to the application to a transmission, and can also be applied to a differential or in another "extremely severe lubrication state".

From the results in Table 3 and Table 4, the following was found. It was confirmed that, through verification of the calculated "collar-portion lubrication coefficient" and results of the seizure resistance test, when the ratio $R_{ACTUAL}/R$ of the actual curvature radius $R_{ACTUAL}$ and the set curvature radius R was set so that the "collar-portion lubrication coefficient" exceeded $8 \times 10^{-9}$, and a practicable ratio was obtained. Thus, the "collar-portion lubrication coefficient"=$8 \times 10^{-9}$ can be used as a threshold value for setting the practicable ratio $R_{ACTUAL}/R$ of the actual curvature radius $R_{ACTUAL}$ to the set curvature radius R.

Further, the oil film parameter depends on the composite roughness of the large end surface 14b of the tapered roller 14 and the large-collar surface 12e of the inner ring 12. Thus, such a conclusion is drawn that it is desired that the large end surface 14b and the large-collar surface 12e be superfinished surfaces. Therefore, in this embodiment, the large end surface 14b and the large-collar surface 12e are the superfinished surfaces. Surface roughness of the large end surface 14b of the tapered roller 14 is equal to or smaller than 0.10 μmRa, and surface roughness of the large-collar surface 12e of the inner ring 12 is equal to or smaller than 0.063 μmRa. The superfinished surfaces described in Claims have the surface roughness described above.

Figure 5A:
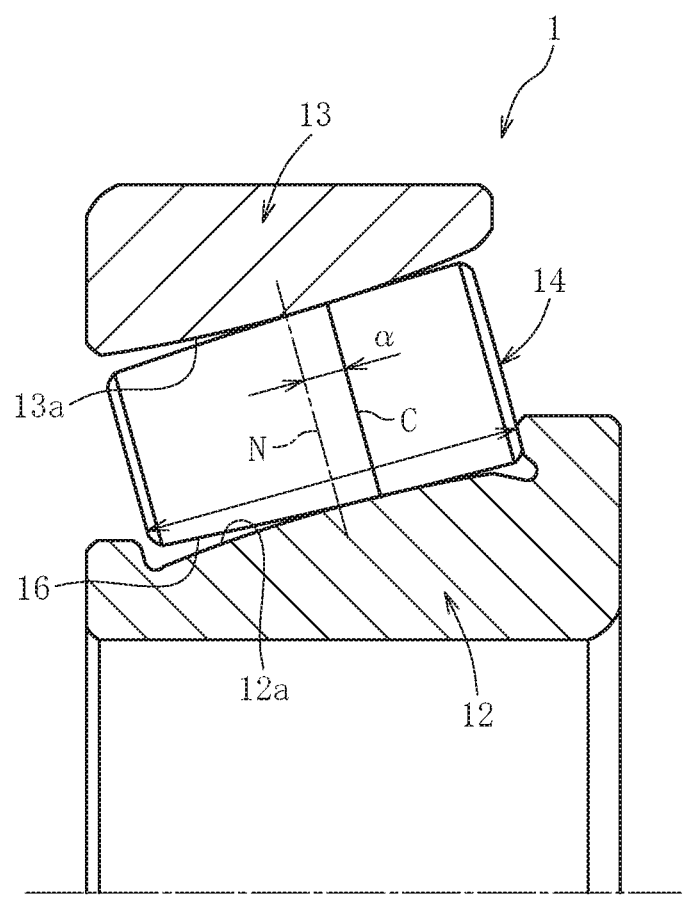
FIG. 5a is a vertical sectional view for illustrating an abutment state between a rolling surface of the tapered roller and a raceway surface of each of the inner ring and an outer ring of FIG. 1, and illustrating a case in which a vertex of crowning of the raceway surface of each of the inner and outer rings is displaced.
Figure 5B:
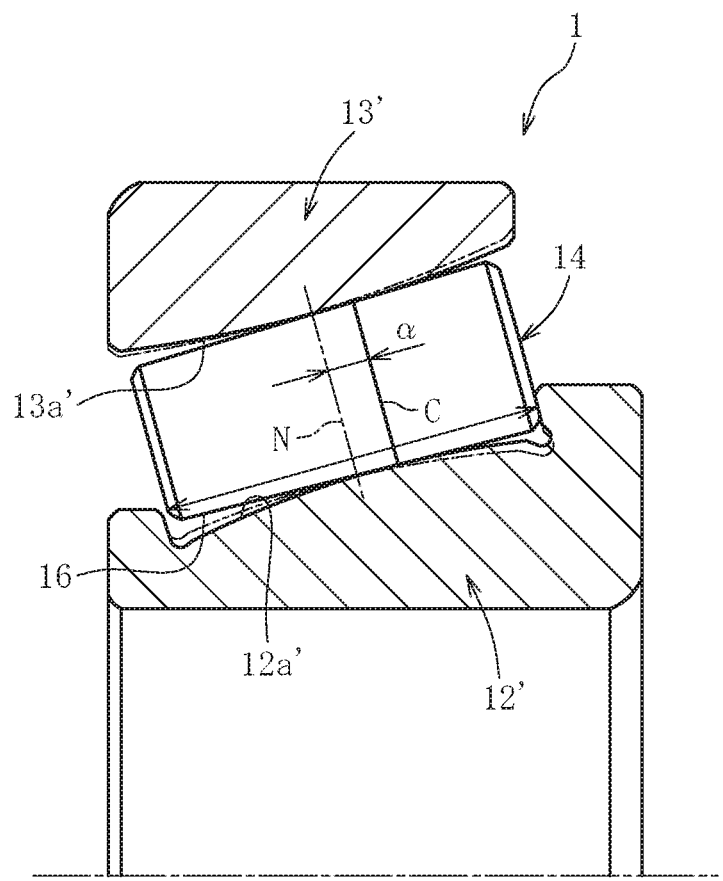
FIG. 5b is a vertical sectional view for illustrating the abutment state between the rolling surface of the tapered roller and the raceway surface of each of the inner ring and the outer ring of FIG. 1, and illustrating a case in which an angle of the raceway surface of each of the inner and outer rings is changed.
Figure 6:
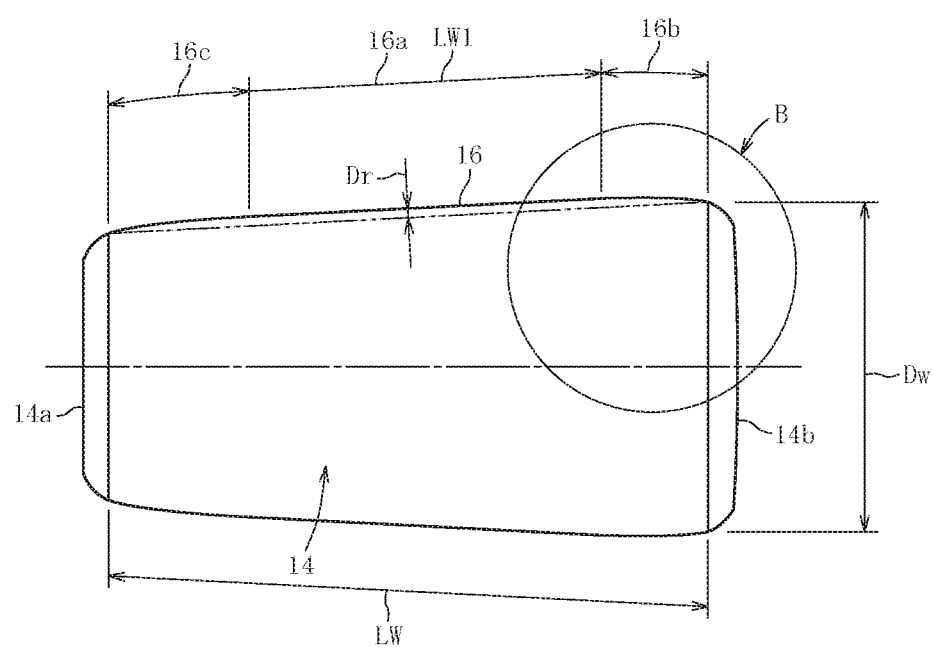
FIG. 6 is a vertical sectional view for illustrating a detailed shape of the tapered roller of FIG. 1.

With reference to FIG. 5a and FIG. 5b, description is made of shapes of the raceway surfaces of the inner and outer rings for suppressing skew of the tapered roller, which are a second characteristic configuration of the tapered roller bearing according to this embodiment. FIG. 5a is a vertical sectional view for illustrating an abutment state between the rolling surface of the tapered roller and the raceway surfaces of the inner and outer rings, and illustrating a case in which a vertex of crowning of the raceway surface of each of the inner and outer rings is displaced. FIG. 5b is a vertical sectional view for illustrating a case in which an angle of the raceway surface of each of the inner and outer rings is changed. In FIG. 5a and FIG. 5b, for ease of understanding of the abutment state between the rolling surface of the tapered roller and the raceway surfaces of the inner and outer rings, crowning shapes of the raceway surfaces are illustrated with emphasis.

The skew angle of the tapered roller 14 is significantly influenced by abutment positions of the rolling surface 16 of the tapered roller 14 with the raceway surface 12a of the inner ring 12 and the raceway surface 13a of the outer ring 13. When nominal design dimensions are obtained, a position of the vertex of the crowning corresponds to an axial center of the raceway surface 12a of the inner ring 12, an axial center of the raceway surface 13a of the outer ring 13, or an axial center of the rolling surface 16 of the tapered roller 14. Further, an angle of the raceway surface 12a of the inner ring 12 and an angle of the raceway surface 13a of the outer ring 13 match with each other at a cone center (vertex O of FIG. 2). When centers C of the abutment positions of the rolling surface 16 of the tapered roller 14 with the raceway surface 12a of the inner ring 12 and the raceway surface 13a of the outer ring 13 are offset by an amount α, the abutment positions can be displaced to the large-diameter side or the small-diameter side. The following two methods can be carried out as the method therefor.

FIG. 5a is an illustration of a method of displacing the vertex of the crowning. FIG. 5b is an illustration of a method of changing angles of a raceway surface 12a' of an inner ring 12' and a raceway surface 13a' of an outer ring 13'. For example, in the case of FIG. 5a, with respect to an axial center N of the tapered roller 14, the position of the vertex of the crowning of each of the raceway surface 12a of the inner ring 12 and the raceway surface 13a of the outer ring 13 is offset to the large-diameter side by the amount α, and thus the centers of the abutment positions are displaced to the line indicated by C.

When abutment is performed on the large-diameter side in FIG. 5b, angles of the raceway surface 12a' of the inner ring 12' and the raceway surface 13a' of the outer ring 13' are inclined to the large-diameter side (inclined clockwise in a case of the outer ring, and inclined counterclockwise in a case of the inner ring), and the centers C of the abutment positions are offset by the amount α with respect to the axial center N of the tapered roller 14. The two-dot chain lines of FIG. 5b indicate the angles of the raceway surfaces 12a' and 13a' when the axial center N of the tapered roller 14 matches with the centers C of the abutment positions. However, when the centers C of the abutment positions are displaced from the axial center N of the tapered roller 14, slippage occurs between the rolling surface 16 of the tapered roller 14 and the raceway surface 12a, 12a' of the inner ring 12, 12' and between the rolling surface 16 of the tapered roller 14 and the raceway surface 13a, 13a' of the outer ring 13, 13'. As the displacement amount α increases, a level of the slippage increases, which results in increase in rotation torque of the bearing.

In order to suppress skew of the tapered roller 14, an analysis was carried out on a relationship among the displacement amount α of the centers C of the abutment positions of the rolling surface 16 of the tapered roller 14 with the raceway surface 12a, 12a' of the inner ring 12, 12' and the raceway surface 13a, 13a' of the outer ring 13, 13', the skew angle, and the bearing torque, and a practicable range was verified. The results are shown in Table 5. In Table 5, the displacement amount α is shown as a percentage with respect to the effective rolling surface width LW (see FIG. 6) of the rolling surface 16 of the tapered roller 14. A positive sign represents the abutment on the large-diameter side, and a negative sign represents the abutment on the small-diameter side. The skew angle φ0 and the torque M0 have values obtained when the displacement amount α is 0%.

TABLE 5

| | Displacement amount α (%) | | | | | |
|---|---|---|---|---|---|---|
| | −10 | −5 | 0 | +5 | +10 | +15 | +20 |
| Skew angle ratio φ/φ0 | 2 | 1.5 | 1 | 0.75 | 0.5 | 0.4 | 0.3 |
| Rotation torque ratio M/M0 | 1.2 | 1.1 | 1 | 1.03 | 1.05 | 1.1 | 1.2 |
| Determination | x | x | ○ | ○ | ○ | ○ | x |

As shown in Table 5, it can be seen that the skew angle φ is smaller in the case of abutment on the large-diameter side than in a case in which the displacement amount α is 0%. Further, as the displacement amount α increases, the rotation torque M increases. A larger influence is exerted on the rotation torque M in the case of abutment on the small-diameter side than in the case of abutment on the large-diameter side. When the displacement amount α is −5%, the skew angle becomes 1.5 times as large as the skew angle in the case in which the displacement amount α is 0%. Thus, an influence on heat generation cannot be disregarded. Accordingly, it was determined as impracticable (x). Further, when the displacement amount α is equal to or larger than 20, slippage on the rolling surface 16 of the tapered roller 14 increases, which results in increase in rotation torque M and another trouble such as peeling. Accordingly, it was determined as impracticable (×).

From the above-mentioned results, it is desired that the displacement amount α be equal to or larger than 0% and smaller than 20% in order to reduce the skew angle φ and the rotation torque M. In this embodiment, the displacement amount α of the centers C of the abutment positions of the rolling surface 16 of the tapered roller 14 with the raceway surface 12a, 12a' of the inner ring 12, 12' and the raceway surface 13a, 13a' of the outer ring 13, 13' is set to a dimensional range that is equal to or larger than 0% and smaller than 20% of the effective rolling surface width LW of the tapered roller 14. Further, the centers C of the abutment positions are displaced to the large-diameter side from the axial center N of the tapered roller 14.

In this embodiment, the raceway surface 12a, 12a' of the inner ring 12, 12' and the raceway surface 13a, 13a' of the outer ring 13, 13' each having the crowning shape are exemplified, but the present invention is not limited thereto. The raceway surface of the inner ring 12 and the raceway surface of the outer ring 13 may each have a straight shape. In this case, abutment widths of the rolling surface 16 of the tapered roller 14 with the raceway surface of the inner ring 12 and the raceway surface of the outer ring 13 are increased, but the centers C of the abutment positions are determined in accordance with the abutment widths. The centers of the abutment positions described in Description and Claims encompass the above-mentioned case.

As a third characteristic configuration of the tapered roller bearing according to this embodiment, logarithmic crowning is formed on the rolling surface of the tapered roller, and the raceway surface of the inner ring and the raceway surface of the outer ring are each formed into a straight shape or a full-crowning shape having a gentle single arc.

Figure 7:
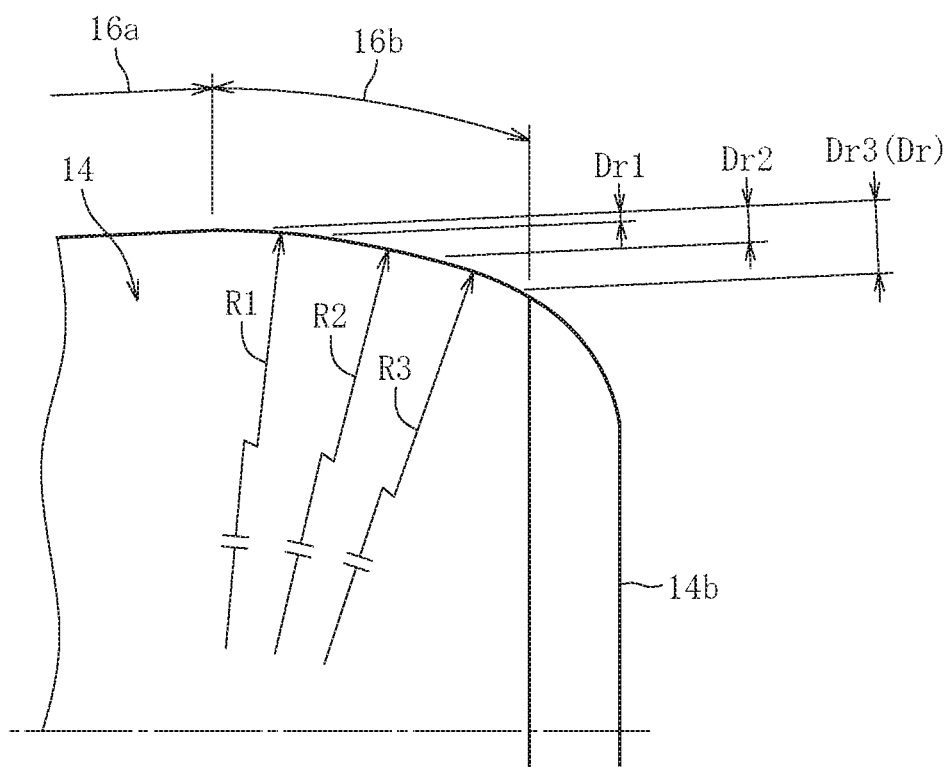
FIG. 7 is an enlarged view for illustrating a portion "B" of FIG. 6.

Detailed shapes of the tapered roller, the inner ring, and the outer ring are described with reference to FIG. 6 to FIG. 9. FIG. 6 is an enlarged front view for illustrating the tapered roller in FIG. 1. FIG. 7 is an enlarged view for illustrating a portion "B" in FIG. 6. FIG. 8 are enlarged vertical sectional views for illustrating the inner ring in FIG. 1. FIG. 9 is a schematic view for illustrating a shape of the raceway surface of the inner ring in FIG. 8 in the generating-line direction.

As illustrated in FIG. 6, the rolling surface 16 of the tapered roller 14 comprises the straight portion 16a formed at the center portion of the rolling surface 16 in the generating-line direction, and the logarithmic crowning portions (hereinafter, simply referred to as "crowning portions") 16b and 16c formed at the both end portions of the rolling surface 16 in the generating direction. The effective rolling surface width of the tapered roller 14 is represented by LW, and a width of the straight portion 16a is represented by LW1. A diameter of the tapered roller 14 on the large-diameter side is a roller diameter Dw.

Here, the logarithmic crowning formed on the tapered roller 14 is described. A generating line of each of the crowning portions 16b and 16c is determined based on, for example, the logarithmic curve of the logarithmic crowning expressed by the following expression. This logarithmic crowning expression corresponds to a logarithmic crowning expression described in Japanese Patent No. 5037094 granted to the applicant of the present application.

$$z(y) = K_1 A \ln \frac{1}{1 - \left\{1 - \exp\left(-\frac{z_m}{K_1 A}\right)\right\}\left(\frac{y-a}{K_2 a} + 1\right)^2} \quad \text{[Expression 2]}$$

A: $=2Q/\pi I E'$
a: Length from an origin O to an end of an effective contact portion
E': Equivalent elastic modulus
$K_1$: Parameter representing a degree of a curvature of crowning
$K_2$: Parameter representing a ratio of crowning length with respect to "a"
I: Length of an effective contact portion in the generating line direction
Q: Load
y: Position of the contact portion in the generating-line direction
z(y): Drop amount at the axial position "y"
$z_m$: Parameter representing an optimum value of a maximum drop amount of crowning at the end in the effective length of the roller The design parameters $K_1$, $K_2$, and $z_m$ in the logarithmic crowning expression described above are subjected to design. Description is made of a mathematical optimization method for the logarithmic crowning. Through determination of the design parameter $K_2$ and appropriate selection of the parameters $K_1$ and $z_m$ in the function expression expressing the logarithmic crowning, optimum logarithmic crowning can be designed. In general, the crowning is designed so as to reduce the surface pressure of the contact portion or a maximum value of stress. It is assumed that the rolling fatigue lifetime occurs in accordance with the von Mises yield criterion, and the parameters $K_1$ and $z_m$ are selected so as to minimize a maximum value of the von Mises equivalent stress. The parameters $K_1$ and $z_m$ can be selected with use of an appropriate mathematical optimization method. Various mathematical optimization methods have been proposed, and the direct search method as one example is capable of executing optimization without use of derivatives of function, and is effective for a case in which an objective function and variables cannot be directly expressed with use of expressions. In this case, the parameters $K_1$ and $z_m$ are determined with use of the Rosenbrock method as one of direct search methods.

The shape of each of the crowning portions 16b and 16c of the tapered roller 14 in this embodiment is the logarithmic curve crowning determined by Expression 2 described above. However, the expression for determination of the logarithmic curve crowning is not limited to the expression described above, the logarithmic curve may be determined with use of another logarithmic crowning expression.

The crowning portions 16b and 16c of the tapered roller 14 illustrated in FIG. 6 each have crowning having a shape approximate to the logarithmic curve of the logarithmic crowning determined by the expression described above. With reference to FIG. 7, description is made of details of the logarithmic crowning portion 16b formed on the large end surface 14b side of the tapered roller 14. In FIG. 7, for ease of understanding of the drop amount of the crowning portion 16b, more emphasis is given as compared to the tapered roller 14 illustrated in FIG. 6. The crowning portion 16b has a complex arc shape formed by smoothly connecting three arcs having large curvature radii R1, R2, and R3 to the straight portion 16a. As the drop amounts of the crowning portion 16b, there are defined a drop amount Dr1 at a first gate, an intermediate drop amount Dr2 at a second gate, and a maximum drop amount Dr3 at a third gate so that the crowning shape approximate to the logarithmic curve is formed. The drop amount Dr3 corresponds to Dr of FIG. 6. Further, the drop amount Dr3 corresponds to $z_m$ in Expression 1 described above. With this, surface pressure distribution in the axial direction can be set even while avoiding the edge surface pressure. The drop amount varies depending on the size or the model number, but is about 50 µm at maximum. The crowning portion 16c formed on the side of the small end surface 14a is similar to the crowning portion 16b, and hence description thereof is omitted. The straight portion of the rolling surface of the tapered roller described in Description also encompasses a portion having a straight shape and a portion having a substantially straight shape with crowning having a drop amount of about several micrometers.

Figure 8A:
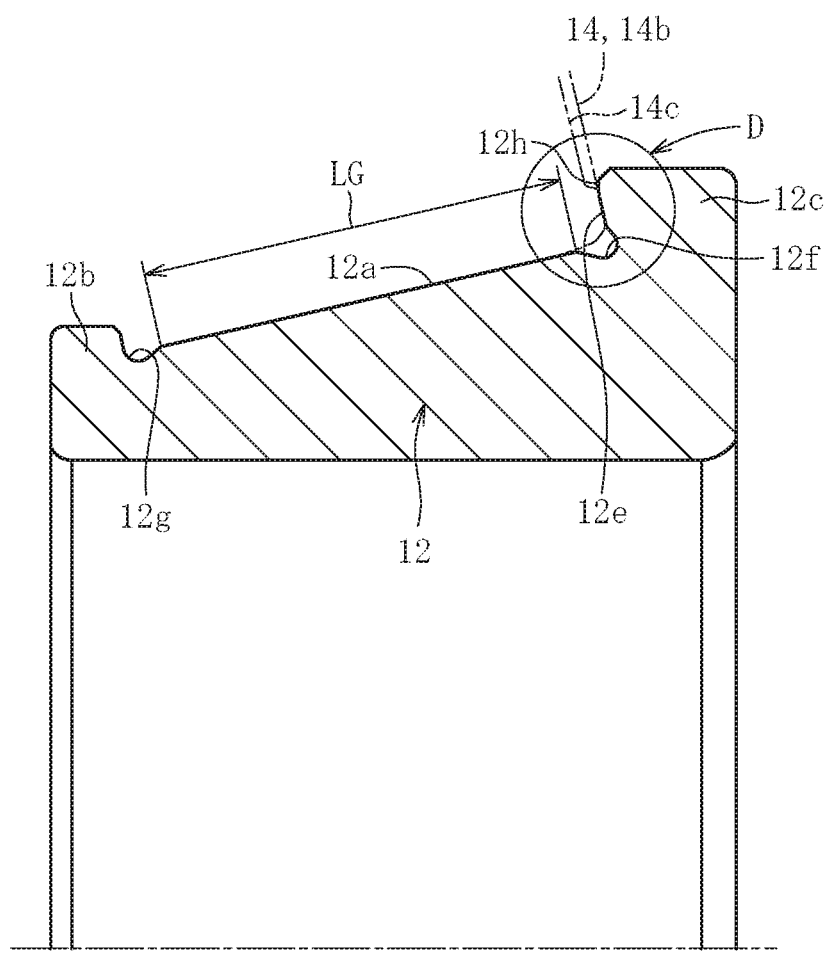
FIG. 8a is a vertical sectional view for illustrating a detailed shape of the inner ring of FIG. 1.
Figure 8B:
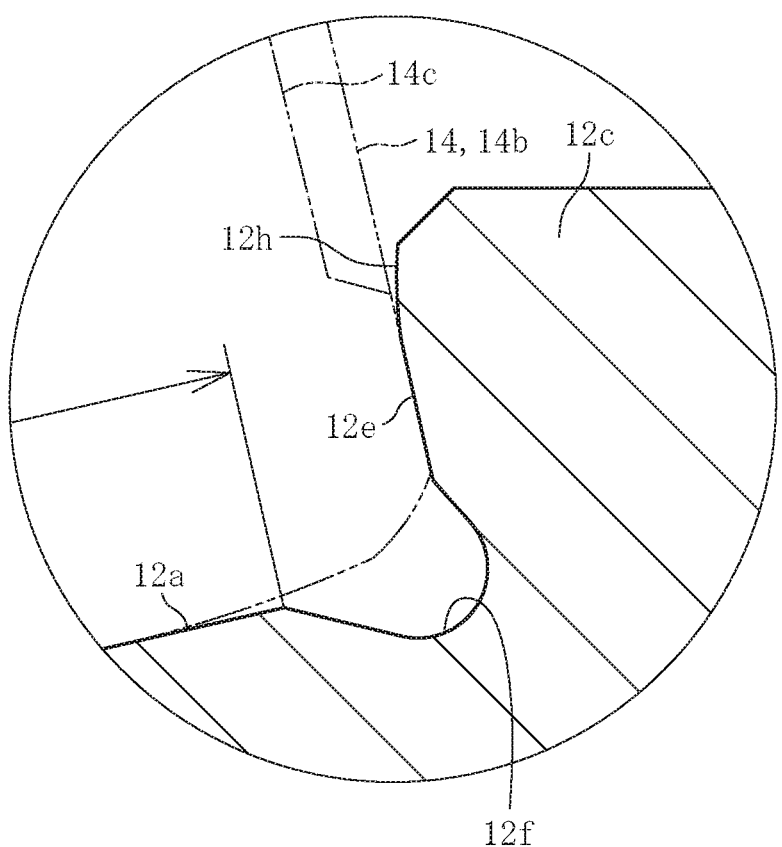
Figure 9:
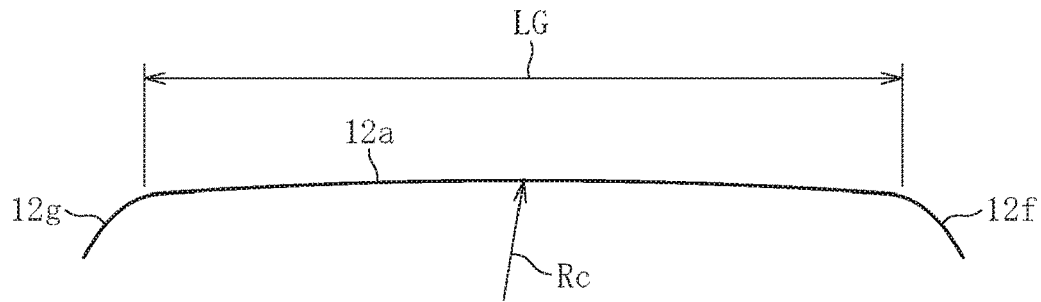
FIG. 9 is a schematic view for illustrating a shape of the raceway surface of the inner ring of FIG. 8a in a generating-line direction of the raceway surface.

Next, with reference to FIG. 8 and FIG. 9, description is made of a shape of the raceway surface 12a of the inner ring 12 in the generating-line direction. FIG. 8a is a vertical sectional view for illustrating a detailed shape of the inner ring 12. FIG. 8b is an enlarged view for illustrating a portion "D" in FIG. 8a. FIG. 9 is a schematic view for illustrating a shape of the raceway surface 12a of the inner ring 12 of FIG. 8 in the generating-line direction. In FIG. 8a and FIG. 8b, a part of a contour on the large end surface 14b side of the tapered roller 14 is indicated by the two-dot chain lines.

As illustrated in FIG. 8a and FIG. 9, the raceway surface 12a of the inner ring 12 is formed into a full-crowning shape having a gentle single arc, and is continuous with the ground relief portions 12f and 12g. A curvature radius Rc of the full-crowning having the gentle single arc is significantly large as to involve the drop amount of about 5 µm at each end of the raceway surface 12a. As illustrated in FIG. 8a, the ground relief portions 12f and 12g are formed on the raceway surface 12a of the inner ring 12, and hence the raceway surface 12a has an effective raceway surface width LG.

As illustrated in FIG. 8b, a relief surface 12h is formed on a radially outer side of the large-collar surface 12e so as to be smoothly continuous with the large-collar surface 12e. Owing to a wedge-shaped gap defined between the relief surface 12h and the large end surface 14b of the tapered roller 14, a drawing action for the lubricating oil is enhanced, thereby being capable of forming a sufficient oil film. As the shape of the raceway surface 12a of the inner ring 12 in the generating-line direction, the full-crowning shape having the gentle single arc is exemplified. However, the shape of the raceway surface 12a of the inner ring 12 in the generating-line direction is not limited thereto, and may be a straight shape.

In the above, the shape of the raceway surface 12a of the inner ring 12 in the generating-line direction is described. A shape of the raceway surface 13a of the outer ring 13 in the generating-line direction is similar to the shape of the raceway surface 12a of the inner ring 12 in the generating-line direction, and hence description thereof is omitted.

Now, description is made of verification results leading to a concept of this embodiment in which the rolling surface 16 of the tapered roller 14 is formed into the logarithmic crowning shape (having a straight shape at a center portion), and the raceway surface 12a of the inner ring 12 and the raceway surface 13a of the outer ring 13 are each formed into a straight shape or the full-crowning shape having a gentle single arc.

With regard to a tapered roller bearing (having an inner diameter φ of 35 mm, an outer diameter φ of 62 mm, and a width of 18 mm) for a transmission of an automobile, under a low speed condition (first speed) with misalignment and a high speed condition (fourth speed) without misalignment, verification was made on the contact surface pressure on the raceway surface 13a of the outer ring 13 and on a ratio of a contact ellipse with respect to the effective rolling surface width LW (see FIG. 6) of the rolling surface 16 of the tapered roller 14. Samples used for the verification are shown in Table 6.

TABLE 6

| Sample 1 | Sample 2 |
| --- | --- |
| Sample is based on this embodiment. Tapered roller: logarithmic crowning (having a straight shape at a center portion, drop amount at each end of a rolling surface: large and having a size of from about 20 µm to about 30 µm) Inner and outer rings: straight shape or full-crowning shape (drop amount: small and having a size of about 5 µm) | Tapered roller: full-crowning shape (drop amount at each end of a rolling surface: small and having a size of about 3 µm) Inner ring: cut-crowning shape (having a straight shape at a center portion, drop amount at each end of a rolling surface: large and having a size of about 15 µm) Outer ring: full-crowning shape (drop amount at each end of a rolling surface: large and having a size of about 20 µm) |

The verification results are shown in Table 7.

TABLE 7

| Verification condition | Sample | Surface pressure on raceway surface of outer ring (MPa) | | Contact ellipse (major axis)/ roller effective rolling surface width LW | Determination |
| --- | --- | --- | --- | --- | --- |
| | | $P_{MAX}$ | $P_{EDGE}$ | | |
| Without misalignment (high speed condition) | Sample 1 | 2,000 | Undetected | 75 | ○ |
| | Sample 2 | 1,500 | Undetected | 55 | X |
| With misalignment (low speed condition) | Sample 1 | 3,000 | Undetected | 78 | ○ |
| | Sample 2 | 2,500 | Detected | 100 | X |

Under the high speed condition without misalignment, a load condition is relatively mild. Thus, as shown in Table 7, no edge surface pressure ($P_{EDGE}$) is generated in both of Sample 1 and Sample 2. However, in Sample 2, the drop amount of the full-crowning of the outer ring is large, and the contact ellipse (major axis) is short. As a result, more variation is seen in the center C of the abutment position as compared to a case in which a contact region is long, which is liable to induce skew of the tapered roller. Accordingly, it was determined as impracticable (×).

In contrast, under the low speed condition with misalignment, load is high. Thus, in Sample 2, the ratio of the contact ellipse with respect to the roller effective rolling surface width LW is 100%, and an edge surface pressure is generated on the outer ring. Moreover, edge abutment occurs so that driving is performed under a contact state on the small end surface side of the tapered roller. As a result, large skew is induced. Accordingly, it was determined as impracticable (×).

From the above description, it was verified that formation of full-crowning having a large drop amount on the outer ring is not preferred for suppression of skew, and significance of Sample 1 was confirmed. Thus, this embodiment was achieved.

Figure 10:
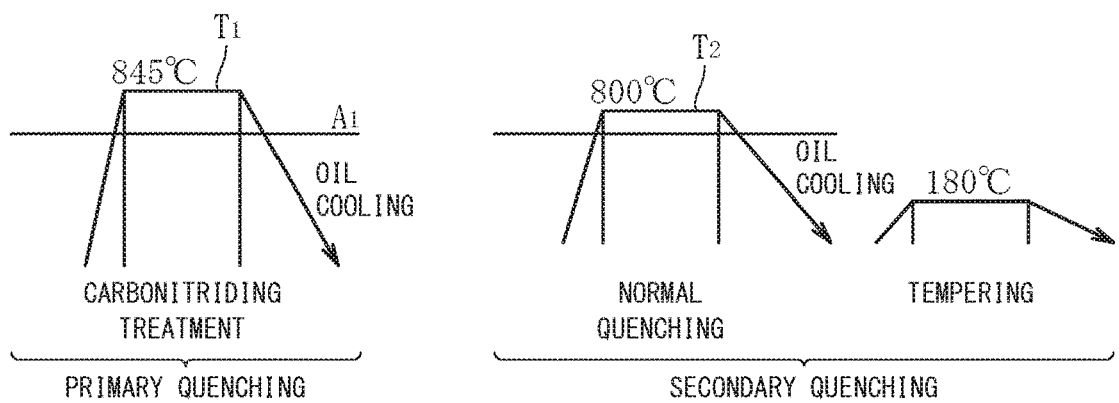
FIG. 10 is a view for illustrating a heat treatment method for the tapered roller bearing of FIG. 1.
Figure 11:
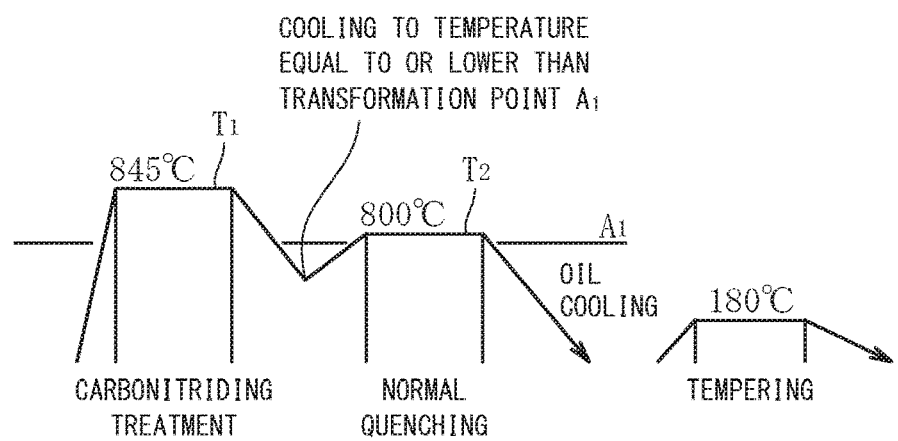
FIG. 11 is a view for illustrating a modification example of the heat treatment method of FIG. 10.

The inner ring 12, the outer ring 13, and the tapered rollers 14 of the tapered roller bearing 1 according to this embodiment are each made of high-carbon chromium bearing steel (for example, SUJ2 steel), and at least one of bearing components among the inner ring 12, the outer ring 13, and the tapered rollers 14 is subjected to heat treatment for forming a nitrogen-enriched layer. This heat treatment method is described with reference to FIG. 10 and FIG. 11. FIG. 10 is a view for illustrating a heat treatment pattern of a method of performing primary quenching and secondary quenching. FIG. 11 is a view for illustrating a heat treatment pattern of a method of cooling a material to a temperature lower than a transformation point $A_1$ midway through the quenching, performing heating again, and performing quenching finally. In FIG. 10 and FIG. 11, in a process $T_1$, after penetration of carbon is performed sufficiently while carbon and nitrogen are dispersed in a steel blank, and then the blank is cooled to a temperature lower than the transformation point $A_1$. Next, in a process $T_2$ of FIG. 10 and FIG. 11, the blank is heated again to a temperature equal to or higher than the transformation point $A_1$ and lower than the temperature in the process $T_1$, and then oil quenching is performed.

Through the above-mentioned heat treatment, as compared to a related-art case in which, subsequent to carbonitriding quenching, namely, carbonitriding treatment, quenching is performed once as it is, fracture resistance can be increased while a surface layer portion is subjected to carbonitriding, and a ratio of dimensional change over time can be reduced.

The tapered roller bearing 1 manufactured through the heat treatment pattern of FIG. 10 or FIG. 11 has the microstructure in which a grain diameter of austenite crystal grain is equal to or smaller than a half of a grain diameter in the related art. Thus, lifetime is long against rolling fatigue, and fracture resistance is increased, thereby being capable of reducing the ratio of dimensional change over time. The heat treatment step of lowering a secondary quenching temperature is performed in order to micronize the crystal grain, and thus an amount of remaining austenite is reduced on the surface layer and inside the tapered roller bearing. As a result, excellent fracture resistance and excellent resistance against dimensional change over time can be obtained.

Figure 12A:
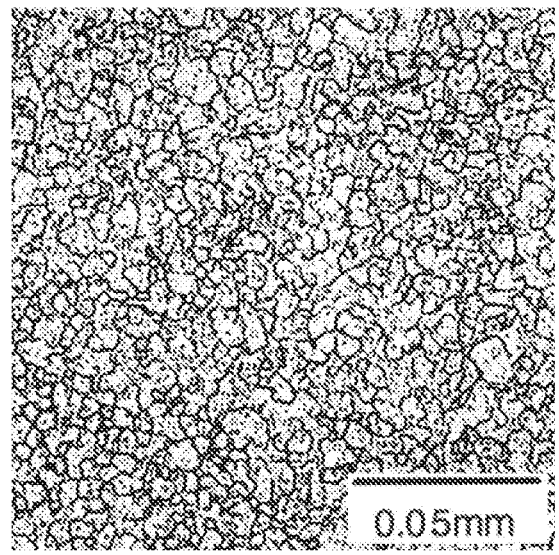
FIG. 12a is a view for illustrating the microstructure of a bearing component subjected to the heat treatment of FIG. 10 or FIG. 11, in particular, austenite grain.
Figure 12B:
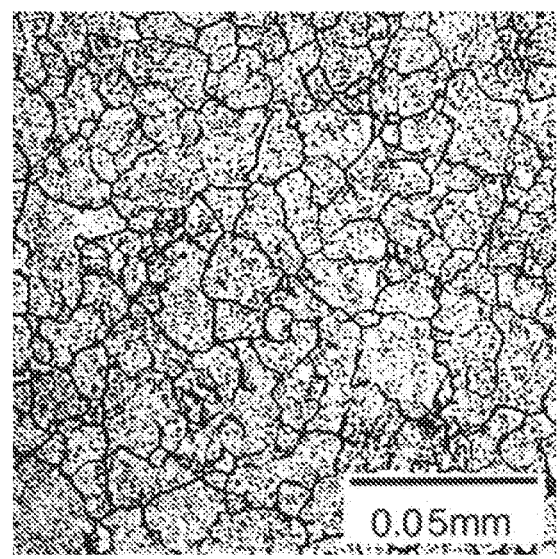
FIG. 12b is a view for illustrating the microstructure and austenite grain of a related-art bearing component subjected to the heat treatment.
Figure 13A:
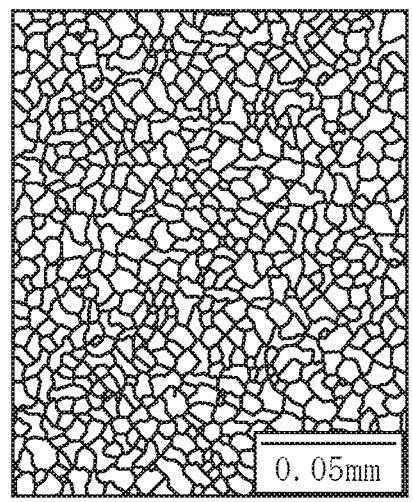
Figure 13B:
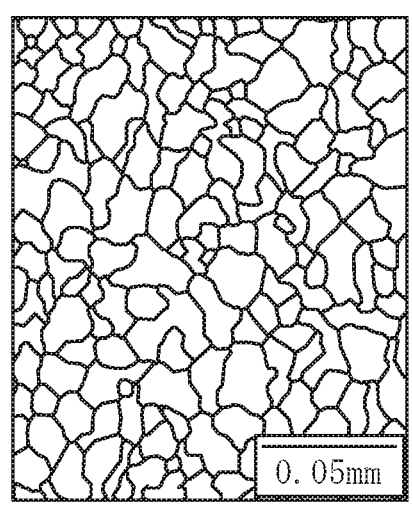
FIG. 13b is an illustration of the austenite grain boundary of FIG. 12b.

FIG. 12 are views for illustrating the microstructure of the bearing component, in particular, austenite grain. FIG. 12a is a view for illustrating the bearing component in this embodiment. FIG. 12b is a view for illustrating a related-art bearing component manufactured by the heat treatment method. That is, FIG. 12a is an illustration of an austenite crystal grain size of a raceway ring (the inner ring or the outer ring) to which the heat treatment pattern illustrated in FIG. 10 is applied. Further, for comparison, FIG. 12b is an illustration of an austenite crystal grain size of the related-art bearing steel obtained through the heat treatment method. Further, FIG. 13a and FIG. 13b are illustrations of the austenite crystal grain sizes in FIG. 12a and FIG. 12b. Based on the structures having the austenite crystal grain sizes, a grain diameter of the related-art austenite has No. 10 in terms of the grain size number of JIS standard, and fine grain having No. 12 can be obtained through the heat treatment method illustrated in FIG. 10 or FIG. 11. Further, an average grain diameter in FIG. 12a was 5.6 µm as a result of measurement by a section method.

In addition to having the first to third characteristic configurations described above, the tapered roller bearing 1 according to this embodiment can have rolling fatigue lifetime that is significantly improved, and can obtain excellent fracture resistance and excellent resistance against dimensional change over time by forming the nitrogen-enriched layer on the bearing component, and then micronizing the grain in order to obtain an austenite grain diameter having No. 11 or more in terms of the grain size number.

Description is made of the case in which the inner ring 12, the outer ring 13, and the tapered rollers 14 of the tapered roller bearing 1 according to this embodiment are each made of high-carbon chromium bearing steel (for example, SUJ2 material), and at least one of the bearing components among the inner ring 12, the outer ring 13, and the tapered rollers 14 is subjected to the heat treatment for forming the nitrogen-enriched layer, but the present invention is not limited thereto. The inner ring 12 and the outer ring 13 may be made of carburized steel such as chromium steel (for example, SCR435) or chromium-molybdenum steel (for example, SCM435). Carburizing, quenching, and tempering applied conventionally may be applied as the heat treatment.

Next, a tapered roller bearing according to a second embodiment of the present invention is described. The tapered roller bearing according to this embodiment is different from the tapered roller bearing according to the first embodiment in that the tapered roller bearing according to the second embodiment is used at a slightly lower level of severity of the lubrication state in which the viscosity characteristic of the lubricating oil is added to the "assumed peak temperature condition", and that there is enlarged a practicable range of the ratio of the actual curvature radius $R_{ACTUAL}$ to the set curvature radius R in the large end surface of the tapered roller. Other configurations and technical contents are the same as those of the first embodiment. Thus, all the contents including Table 1, Table 5 to Table 7, Expression 1 and Expression 2, and FIG. 1 to FIG. 15 are similarly applied, and only differences are described.

In this embodiment, SAE 75W-90, which is a gear oil often used for a differential, was used as a sample, and the "collar-portion lubrication coefficient" was calculated. The viscosity of SAE 75W-90 at a temperature of 120° C. was 10.3 cSt (=10.3 mm$^2$/s), and the oil film thickness h was obtained by Expression 1. As shown in Table 8, the oil film thickness h has the following values with respect to respective values of the ratio of the actual curvature radius $R_{ACTUAL}$ to the set curvature radius R.

TABLE 8

| | Ratio $R_{ACTUAL}$/R of actual curvature radius $R_{ACTUAL}$ to set curvature radius R | | | | | |
|---|---|---|---|---|---|---|
| | 0.4 | 0.5 | 0.7 | 0.8 | 0.9 | 1.0 |
| Oil film thickness h (×10$^{-4}$ mm) | 4.419 | 4.999 | 5.725 | 5.983 | 6.137 | 6.122 |

The viscosity of 75W-90 at the temperature of 120° C. is slightly higher than that of VG32, and the lubrication state in which the viscosity characteristic of the lubricating oil is added to the "assumed peak temperature condition" has a slightly alleviated condition as compared to the case of the first embodiment. In Description, this lubrication state is referred to as "severe lubrication state".

Similarly to the first embodiment, a seizure resistance test using a rotary testing machine was carried out. A test condition for the seizure resistance test is as follows.

<Test Condition>

Bearing load: radial load of 4,000 N, axial load of 7,000 N

Rpm: 7,000 min$^{-1}$

Lubricating oil: SAE 75W-90

Sample bearing: tapered roller bearing (having an inner diameter φ of 35 mm, an outer diameter φ of 74 mm, and a width of 18 mm)

For respective values of the ratio of the actual curvature radius $R_{ACTUAL}$ to the set curvature radius R, results of the contact surface pressure between the large end surface and the large-collar surface, the oil film thickness, the skew angle, the oil film parameter, and the "collar-portion lubrication coefficient" are shown in Table 9. In Table 9, the contact surface pressure, the oil film thickness, the skew angle, and the oil film parameter are shown as ratios. A denominator as a standard corresponds to a value obtained when processing can be performed so that the actual curvature radius $R_{ACTUAL}$ has the same dimension as that of the set curvature radius R, and a sign of 0 is added to each symbol representing the denominator.

TABLE 9

| | Ratio $R_{ACTUAL}/R$ of actual curvature radius $R_{ACTUAL}$ to set curvature radius R | | | | | |
|---|---|---|---|---|---|---|
| | 0.4 | 0.5 | 0.7 | 0.8 | 0.9 | 1.0 |
| Contact surface pressure ratio p/p0 between large end surface and large-collar surface | 2.7 | 2.2 | 1.6 | 1.4 | 1.2 | 1 |
| Oil film thickness ratio h/h0 | 0.72 | 0.82 | 0.94 | 0.98 | 1.00 | 1.00 |
| Skew angle ratio φ/φ0 | 8 | 5 | 3 | 1.5 | 1.2 | 1 |
| Oil film parameter ratio Λ/Λ0 | 0.72 | 0.82 | 0.94 | 0.98 | 1.00 | 1.00 |
| Collar-portion lubrication coefficient (×10$^{-9}$) | 12.2 | 14.4 | 18.8 | 20.5 | 21.6 | 21.4 |
| Test result | (1) ○ | (2) ○ | (3) ○ | (4) ○ | (5) ○ | (6) ○ |
| Overall determination | (1) x | (2) ○ | (3) ○ | (4) ○ | (5) ○ | (6) ○ |

Details of test results (1) to (6) and overall determinations (1) to (6) of Table 9 are shown in Table 10.

TABLE 10

| | Test result | | | | | |
|---|---|---|---|---|---|---|
| | (1) ○ A significant change was not particularly seen. | (2) ○ The same result as the left column. | (3) ○ The same result as the left column. | (4) ○ The same result as the left column. | (5) ○ The same result as the left column. | (6) ○ The same result as the left column. |
| Overall determination | (1) x The "collar-portion lubrication coefficient" exceeded 8 × 10$^{-9}$, and a sufficient oil film was formed. However, the skew angle was large, and hence there was a fear in that a behavior of the roller was unstable during rotation of the bearing. Accordingly, it was determined as x. | (2) ○ The skew angle was slightly large. However, the "collar-portion lubrication coefficient" largely exceeded 8 × 10$^{-9}$, and a sufficient oil film was formed. Thus, it was determined that development of drastic damage did not occur. Accordingly, it was determined as practicable ○. | (3) ○ The "collar-portion lubrication coefficient" largely exceeded 8 × 10$^{-9}$, a sufficient oil film was formed, and the skew angle was small. Thus, stable rotation was obtained, and there was no problem in continuous use. Accordingly, it was determined as ○. | (4) ○ The same determination as the left column. | (5) ○ The same determination as the left column. | (6) ○ The same determination as the left column. |

A conclusion drawn from the results in Table 9 and Table 10 is that it is desired that the ratio $R_{ACTUAL}/R$ of the actual curvature radius $R_{ACTUAL}$ to the set curvature radius R be equal to or larger than 0.5 in the "severe lubrication state" in which the 75-90W being an oil for a differential is used. Therefore, in this embodiment, the ratio $R_{ACTUAL}/R$ of the actual curvature radius $R_{ACTUAL}$ to the set curvature radius R is set equal to or larger than 0.5. In particular, through introduction of a "collar-portion lubrication coefficient" as a reference indicating a level of severity of the lubrication state, a practicable range of the ratio of the actual curvature radius $R_{ACTUAL}$ to the set curvature radius R can be enlarged. Thus, depending on use conditions, proper bearing specifications can be selected.

However, the tapered roller bearing according to this embodiment is not limited to the application to a differential, and can also be applied to a transmission or in another "severe lubrication state".

At the time of setting the practicable ratio of the actual curvature radius $R_{ACTUAL}$ to the set curvature radius R, only vicinities of the threshold value may be tested and confirmed. Thus, man-hours for design can be reduced. Under the "severe lubrication state" shown in Table 9, even when the ratio of the actual curvature radius $R_{ACTUAL}$ to the set curvature radius R is 0.4, the sufficient "collar-portion lubrication coefficient" can be obtained. However, under the "severe lubrication state" in which a lubricating oil having viscosity slightly lower than that shown in Table 9 is used, when the ratio of the actual curvature radius $R_{ACTUAL}$ to the set curvature radius R is 0.4, there may be a risk in that the "collar-portion lubrication coefficient" does not satisfy the threshold value of $8 \times 10^{-9}$ or more, and the skew angle is increased. Accordingly, it is proper that the ratio of the actual curvature radius $R_{ACTUAL}$ to the set curvature radius R be equal to or larger than 0.5.

Figure 14:
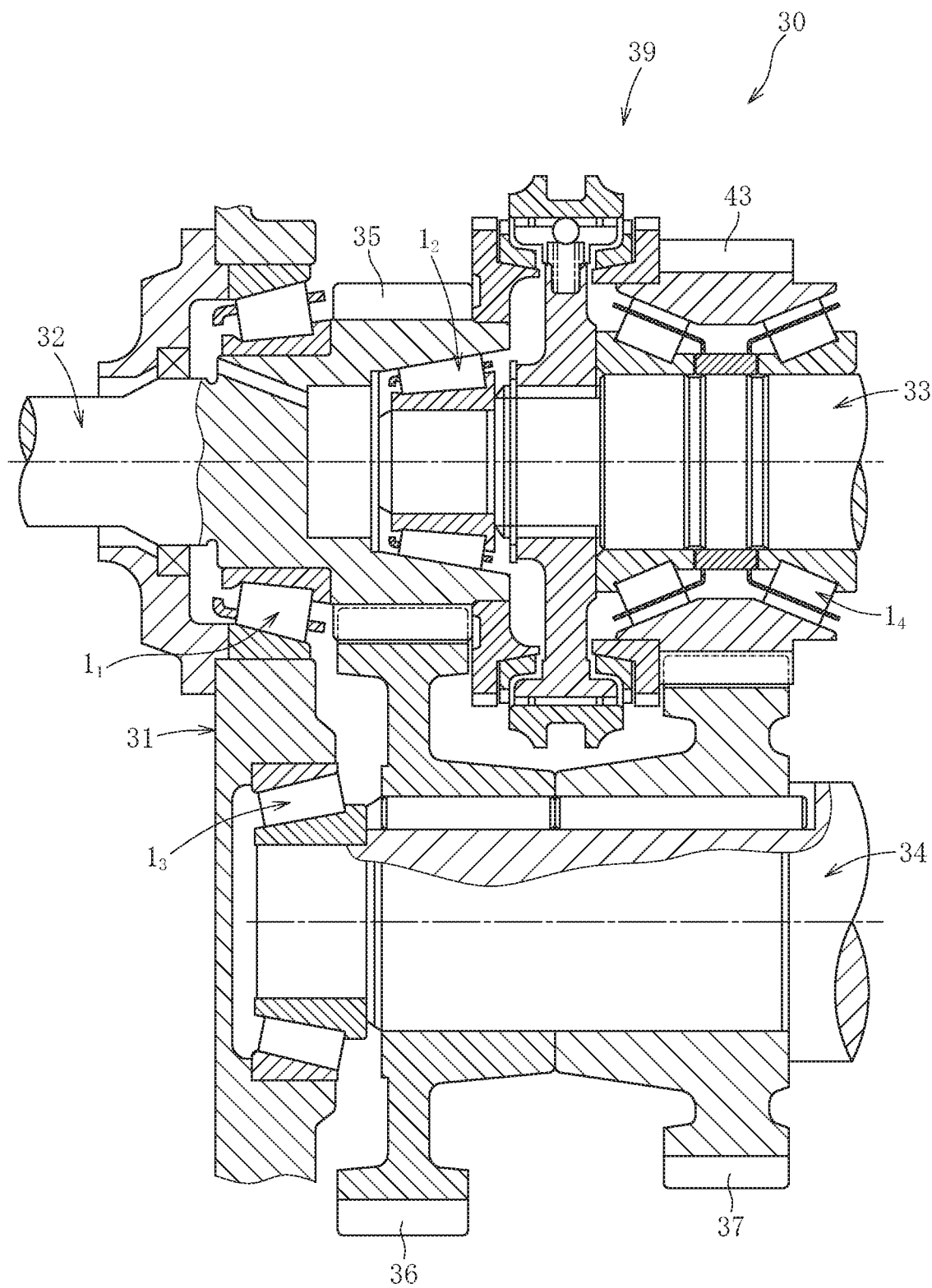
FIG. 14 is a vertical sectional view for illustrating a transmission for an automobile to which the tapered roller bearing of FIG. 1 is applied.
Figure 15:
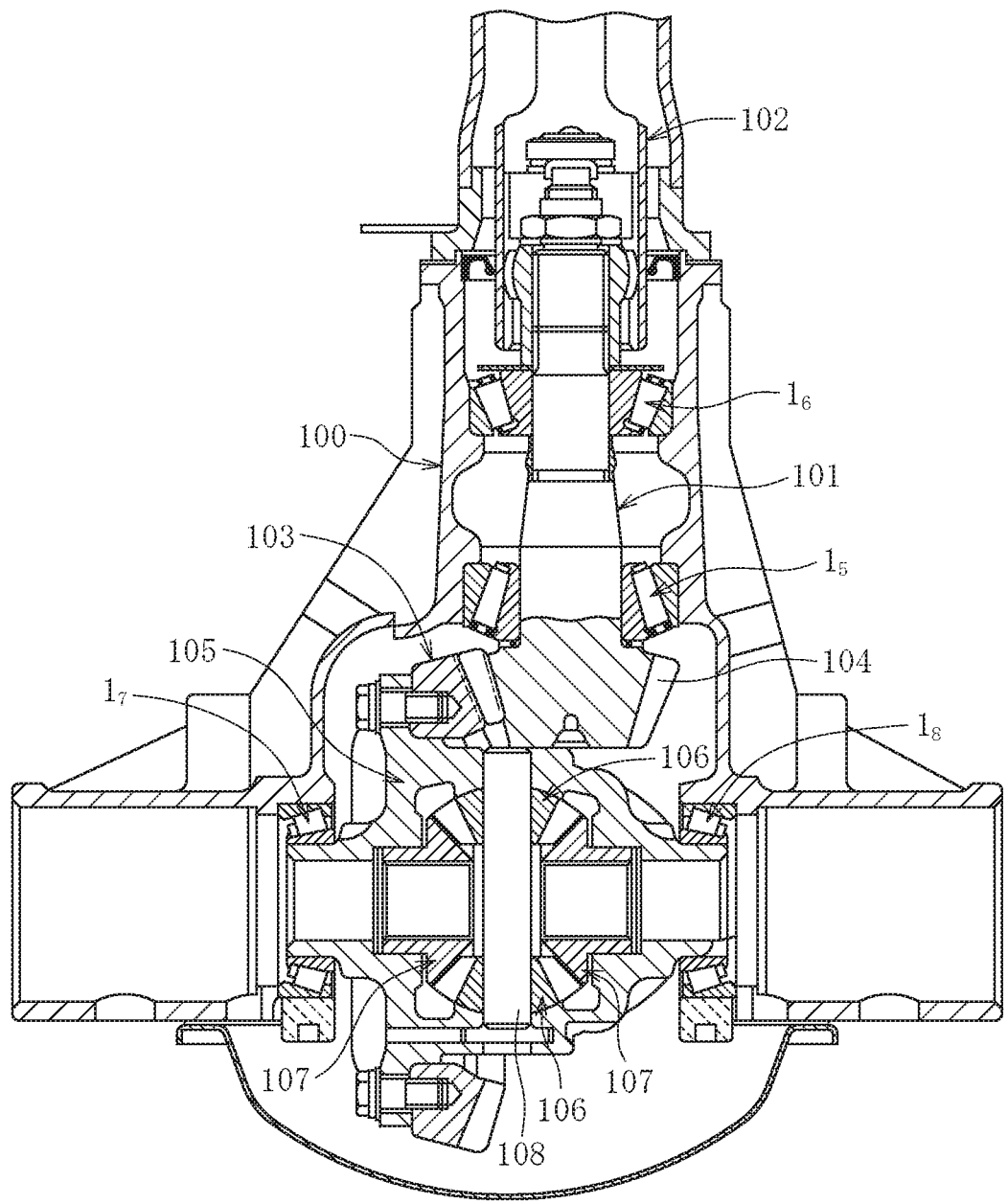
FIG. 15 is a vertical sectional view for illustrating a differential for an automobile to which the tapered roller bearing of FIG. 1 is applied.

Finally, as suitable application of the tapered roller bearing according to the embodiments of the present invention, the outline of a transmission for an automobile and the outline of a differential for an automobile are described with reference to FIG. 14 and FIG. 15. FIG. 14 is a vertical sectional view for illustrating a main part of a transmission for an automobile. FIG. 15 is a vertical sectional view for illustrating a differential for an automobile.

A transmission 30 illustrated in FIG. 14 is an example of a synchronous mesh-type transmission. An input shaft 32 is freely rotatably supported by a mission case 31 through intermediation of a tapered roller bearing $1_1$, and a main shaft 33 is arranged coaxially with the input shaft 32. The input shaft 32 and the main shaft 33 are supported by a tapered roller bearing $1_2$ of a pilot portion so as to be rotatable relative to each other. Although not shown, another part of the main shaft 33 is supported by a tapered roller bearing. A countershaft 34 arranged in parallel with the input shaft 32 and the main shaft 33 at a predetermined interval is supported by a tapered roller bearing $1_3$ and another tapered roller bearing (not shown). An input shaft gear 35 is provided integrally with the input shaft 32, and is always in mesh with a countershaft gear 36 of the countershaft 34.

A main shaft gear (hereinafter simply referred to also as "gear") 43 is freely rotatably mounted to the main shaft 33 through intermediation of a tapered roller bearing $1_4$ of an idler portion. The main shaft gear 43 is always in mesh with a gear 37 of the countershaft 34. The tapered roller bearing according to the embodiments of the present invention corresponds to each of the above-mentioned tapered roller bearings $1_1$ to $1_4$ and the another tapered roller bearing (not shown). Through operation of a selector (not shown), a synchro mechanism 39 is moved in the axial direction (right-and-left direction in FIG. 14), thereby performing gear changing operation.

Next, a differential is described with reference to FIG. 15. FIG. 15 is a vertical sectional view for illustrating a differential for a general automobile. A drive pinion shaft 101 is accommodated on an input side of a differential case 100, and is freely rotatably supported by a pair of tapered roller bearings $1_5$ and $1_6$. A propeller shaft 102 is coupled to one end portion of the drive pinion shaft 101. A drive pinion gear (small speed reduction gear) 104, which meshes with a link gear (large speed reduction gear) 103, is provided integrally with another end portion of the drive pinion shaft 101.

The link gear 103 is coupled to a differential gear case 105, and the differential gear case 105 is supported by a pair of tapered roller bearings $1_7$ and $1_8$ so as to be freely rotatable with respect to the differential case 100. Inside the differential gear case 105, a pair of pinion gears 106 and a pair of side gears 107, which mesh with the pair of pinion gears 106, are arranged. The pinion gears 106 are mounted to a pinion shaft 108, and the side gears 107 are mounted to the differential gear case 105. Right and left drive shafts (not shown) are coupled (for example, serration-coupled) to inner diameter portions of the side gears 107. The tapered roller bearing according to the embodiments of the present invention corresponds to each of the above-mentioned tapered roller bearings $1_5$ to $1_8$. Drive torque of the propeller shaft 102 is transmitted via the drive pinion gear 104, the link gear 103, the differential gear case 105, the pinion gears 106, the side gears 107, and the drive shafts in the stated order.

The tapered roller bearing according to the embodiments of the present invention suppresses heat generation between the large end surface of the tapered roller and the large-collar surface of the inner ring, thereby improving seizure resistance and prolonging lifetime. Accordingly, the tapered roller bearing according to the embodiments of the present invention is suitably used for a transmission and a differential for an automobile.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

REFERENCE SIGNS LIST 1 tapered roller bearing
12 inner ring
12a raceway surface
12b small-collar portion
12c large-collar portion
12d small-collar surface
12e large-collar surface
12f ground relief portion
12g ground relief portion
12h relief surface
13 outer ring
13a raceway surface
14 tapered roller
14a small end surface
14b large end surface
15 cage
16 rolling surface
16a straight portion 16b logarithmic crowning portion
16c logarithmic crowning portion
C center of abutment position
Dr drop amount of logarithmic crowning end portion
Dw roller diameter
LG effective raceway surface width
LW effective rolling surface width
LW1 width of straight portion
N axial center of tapered roller
O vertex
R set curvature radius
$R_{ACTUAL}$ actual curvature radius
$R_{BASE}$ base curvature radius
S gap
α displacement amount

The invention claimed is:

1. A tapered roller bearing, comprising:
an outer ring having a tapered raceway surface on an inner periphery thereof;
an inner ring having a tapered raceway surface on an outer periphery thereof, and comprising a large-collar surface on a large-diameter side of the tapered raceway surface, and a small-collar surface on a small-diameter side of the tapered raceway surface;
a plurality of tapered rollers arrayed between both of the tapered raceway surfaces so as to be freely rollable; and
a cage configured to receive the tapered rollers,
each of the tapered rollers having a large end surface to be held in contact with and guided by the large-collar surface of the inner ring during use of the bearing,
wherein when R represents a set curvature radius of the large end surface of each of the tapered rollers, and $R_{BASE}$ represents a base curvature radius from a vertex of a cone angle of each of the tapered rollers to the large-collar surface of the inner ring, a ratio $R/R_{BASE}$ of the set curvature radius R to the base curvature radius $R_{BASE}$ is set within a range of from 0.75 to 0.87, and
wherein when $R_{ACTUAL}$ represents an actual curvature radius of the large end surface of each of the tapered rollers, a ratio $R_{ACTUAL}/R$ of the actual curvature radius $R_{ACTUAL}$ to the set curvature radius R is set equal to or larger than 0.5.

2. The tapered roller bearing according to claim 1, wherein the large end surface of each of the tapered rollers and the large-collar surface of the inner ring are superfinished surfaces.

3. The tapered roller bearing according to claim 1, wherein the large-collar surface of the inner ring has a relief surface.

4. The tapered roller bearing according to claim 1,
wherein the tapered raceway surface of the inner ring and the tapered raceway surface of the outer ring are each formed into a straight shape or a full-crowning shape having an arc, and
wherein the tapered rollers each have a rolling surface formed into a logarithmic crowning shape.

5. The tapered roller bearing according to claim 1, wherein at least one of the inner ring, the outer ring, and the tapered rollers has a nitrogen-enriched layer, and the grain size number of austenite crystal grain in the nitrogen-enriched layer is larger than No. 10.

6. The tapered roller bearing according to claim 1, wherein a center of an abutment position between a rolling surface of each of the tapered rollers and the tapered raceway surface of the inner ring, and a center of an abutment position between the rolling surface of each of the tapered rollers and the tapered raceway surface of the outer ring are displaced from an axial center of each of the tapered rollers to the large-diameter side by a dimension that is larger than 0% of an effective rolling surface width of each of the tapered rollers and smaller than 20% of the effective rolling surface width.

7. The tapered roller bearing according to claim 1, wherein the tapered roller bearing is used for a transmission or a differential for an automobile.

8. A tapered roller bearing, comprising:
an outer ring having a tapered raceway surface on an inner periphery thereof;
an inner ring having a tapered raceway surface on an outer periphery thereof, and comprising a large-collar surface on a large-diameter side of the tapered raceway surface, and a small-collar surface on a small-diameter side of the tapered raceway surface;
a plurality of tapered rollers arrayed between both of the tapered raceway surfaces so as to be freely rollable; and
a cage configured to receive the tapered rollers,
each of the tapered rollers having a large end surface to be held in contact with and guided by the large-collar surface of the inner ring during use of the bearing,
wherein when R represents a set curvature radius of the large end surface of each of the tapered rollers, and $R_{BASE}$ represents a base curvature radius from a vertex of a cone angle of each of the tapered rollers to the large-collar surface of the inner ring, a ratio $R/R_{BASE}$ of the set curvature radius R to the base curvature radius $R_{BASE}$ is set within a range of from 0.75 to 0.87, and
wherein when $R_{ACTUAL}$ represents an actual curvature radius of the large end surface of each of the tapered rollers, a ratio $R_{ACTUAL}/R$ of the actual curvature radius $R_{ACTUAL}$ to the set curvature radius R is set equal to or larger than 0.8.

9. The tapered roller bearing according to claim 8, wherein the large end surface of each of the tapered rollers and the large-collar surface of the inner ring are superfinished surfaces.

10. The tapered roller bearing according to claim 8, wherein the large-collar surface of the inner ring has a relief surface.

11. The tapered roller bearing according to claim 8,
wherein the tapered raceway surface of the inner ring and the tapered raceway surface of the outer ring are each formed into a straight shape or a full-crowning shape having an arc, and
wherein the tapered rollers each have a rolling surface formed into a logarithmic crowning shape.

12. The tapered roller bearing according to claim 8, wherein at least one of the inner ring, the outer ring, and the tapered rollers has a nitrogen-enriched layer, and the grain size number of austenite crystal grain in the nitrogen-enriched layer is larger than No. 10.

13. The tapered roller bearing according to claim 8, wherein a center of an abutment position between a rolling surface of each of the tapered rollers and the tapered raceway surface of the inner ring, and a center of an abutment position between the rolling surface of each of the tapered rollers and the tapered raceway surface of the outer ring are displaced from an axial center of each of the tapered rollers to the large-diameter side by a dimension that is larger than 0% of an effective rolling surface width of each of the tapered rollers and smaller than 20% of the effective rolling surface width.

14. The tapered roller bearing according to claim 8, wherein the tapered roller bearing is used for a transmission or a differential for an automobile.

\* \* \* \* \*